United States Patent
Nandagopalan et al.

(10) Patent No.: US 8,681,810 B2
(45) Date of Patent: Mar. 25, 2014

(54) DYNAMIC CARRIER SENSING THRESHOLDS

(75) Inventors: Saishankar Nandagopalan, San Diego, CA (US); Santosh Abraham, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 412 days.

(21) Appl. No.: 11/734,785

(22) Filed: Apr. 12, 2007

(65) Prior Publication Data

US 2007/0242621 A1 Oct. 18, 2007

Related U.S. Application Data

(60) Provisional application No. 60/792,141, filed on Apr. 13, 2006, provisional application No. 60/827,908, filed on Oct. 3, 2006.

(51) Int. Cl.
*H04L 12/413* (2006.01)

(52) U.S. Cl.
USPC ........................................... 370/445

(58) Field of Classification Search
USPC ......... 370/328, 252, 338, 445; 455/69, 456.5; 375/346; 709/223; 343/754
See application file for complete search history.

(56) References Cited

U.S. PATENT DOCUMENTS

| | | | | |
|---|---|---|---|---|
| 6,157,616 A * | 12/2000 | Whitehead | .................... | 370/252 |
| 6,911,948 B2 * | 6/2005 | Foore et al. | .................... | 343/754 |
| 7,349,403 B2 | 3/2008 | Lee et al. | | |
| 2002/0044614 A1 * | 4/2002 | Molnar et al. | ................ | 375/346 |
| 2004/0252658 A1 * | 12/2004 | Hosein et al. | ................. | 370/328 |
| 2005/0041616 A1 * | 2/2005 | Ginzburg et al. | ............. | 370/328 |
| 2005/0129051 A1 | 6/2005 | Zhu et al. | | |
| 2006/0019679 A1 * | 1/2006 | Rappaport et al. | ......... | 455/456.5 |
| 2006/0270359 A1 * | 11/2006 | Karmi et al. | .................... | 455/69 |
| 2007/0002804 A1 | 1/2007 | Xiong et al. | | |
| 2007/0214247 A1 * | 9/2007 | Yang et al. | .................... | 709/223 |
| 2007/0223438 A1 * | 9/2007 | Bennett | ........................ | 370/338 |

FOREIGN PATENT DOCUMENTS

| | | |
|---|---|---|
| JP | 2004040373 | 2/2004 |
| JP | 2004533158 A | 10/2004 |
| JP | 2005509357 A | 4/2005 |
| RU | 2110159 | 4/1998 |
| RU | 2235430 | 8/2004 |
| WO | WO9922454 A2 | 5/1999 |

(Continued)

OTHER PUBLICATIONS

International Search Report—PCT/US07/066606—International Search Authority, European Patent Office—Aug. 7, 2007.

(Continued)

*Primary Examiner* — Thai Hoang
*Assistant Examiner* — Gbemileke Onamuti
(74) *Attorney, Agent, or Firm* — Charles E. Eggers

(57) ABSTRACT

Systems and methodologies are described that facilitate communication in a wireless network environment. In particular, access points can dynamically adjust transmit power and/or carrier-sensing thresholds to allow multiple access points to communicate concurrently. In aspects, access points exchange node information, including RSSI and node addresses, of nearby nodes. The node information can be utilized to detect hidden nodes and estimate interference levels. Transmit power and/or carrier-sensing thresholds can be modified as a function of distance between source and destination access points, interference from hidden nodes, transmission rates, and/or path loss.

32 Claims, 22 Drawing Sheets

(56) References Cited

FOREIGN PATENT DOCUMENTS

| WO | 0016586 | 3/2000 |
|----|---------|--------|
| WO | WO02082751 A2 | 10/2002 |
| WO | WO03041297 A1 | 5/2003 |

OTHER PUBLICATIONS

Written Opinion—PCT/US07/066606—International Search Authority, European Patent Office—Aug. 7, 2007.

International Preliminary Report on Patentability—PCT/US07/066606—The International Bureau of WIPO, Geneva, Switzerland—Oct. 14, 2008.

IEEE 802.11, "Wireless LAN Medium Access Control (MAC) and Physical Layer (PHY) Specifications", IEEE Standard, 2003.

"Joint SEE-MESH/Wi-MESH Proposal to IEEE 802.11TGs" Extended Service Set (ESS) Mesh Task Group, Doc. No. IEEE 802.1106/328r0, pp. 1-165, Mar. 2006.

Hui Ma et al., "A stochastic model for optimizing physical carrier sensing and spatial reuse in wireless ad hoc networks", Mobile Adhoc and Sensor Systems Conference, 2005. IEEE International Conference, IEEE, Nov. 7, 2005, URL, http://ieeexplore.ieee.org/stamp/stamp.jsp"tp=&arnumber=1542851.

Jing Zhu et al., "Leveraging Spatial reuse in 802.11 mesh networks with enhanced physical carrier sensing", Communications, 2004 IEEE International Conference, IEEE, Jun. 20, 2004, URL, http://ieeexplore.ieee.org/stamp/stamp.jsp"tp=&arnumber=1313303.

Ping Chung Ng et al.,"Achieving scalable performance in large-scale IEEE 802.11 wireless networks", Wireless Communications and Networking Conference, IEEE, Mar. 17, 2005, URL, http://ieeexplore.ieee.org/stamp/stamp.jsp"tp=&arnumber=1424478.

Yang X et al., "On physical carrier sensing in wireless ad hoc networks", INFOCOM 2005. 24th Annual Joint Conference of the IEEE Computer and Communications Societies. Proceedings IEEE, IEEE, Mar. 13, 2005, URL, http://ieeexplore.ieee.org/stamp/stamp.jsp"tp=&arnumber=1498537.

* cited by examiner

DYNAMIC CARRIER SENSING THRESHOLDS

CROSS-REFERENCE

This application claims the benefit of U.S. Provisional Application Ser. No. 60/792,141 entitled "METHOD AND SYSTEM TO SET THE CARRIER SENSING THRESHOLDS IN WLAN SYSTEMS," filed on Apr. 13, 2006 and U.S. Provisional Application Ser. No. 60/827,908 entitled "HIERARCHICAL MESH NETWORK ARCHITECTURE FOR PROVIDING 802.11-BASED SERVICES," filed on Oct. 3, 2006. The entirety of the above-referenced applications are incorporated herein by reference.

BACKGROUND

I. Field

The following description relates generally to wireless communications, and, amongst other things, to spatial reuse in wireless networks.

II. Background

Wireless networking systems have become a prevalent means by which a majority of people worldwide has come to communicate and transfer, access, manipulate and process data. Consumers have become dependent upon wireless devices such as cellular telephones, personal digital assistants (PDAs), laptop computers and the like, demanding reliable service and expanded areas of coverage for wireless networks.

Many individuals and/or organizations have replaced or supplemented traditional wired networks with wireless network systems. Typically, terminals or end devices connect to a network via a set of access points. These access points can be wired to the network infrastructure. However, in wireless networks such as mesh wireless local area networks (WLANs), a subset of access points can connect wirelessly to the network infrastructure. One advantage of mesh or wireless networks is ease of deployment or installation. Once a wired infrastructure has been installed, wireless access points can be distributed throughout the desired coverage area to optimize coverage. Unlike wired access points, wireless access points can be easily repositioned without requiring additional stringing of cables or wires. In addition, users enjoy the enhanced flexibility.

Wireless access points relay data to wired access points to facilitate communication with a network. The data can be transmitted through multiple wireless access points. However, available system resources can be limited and transmissions by multiple wireless access points can cause interference, reducing system performance and causing loss of data.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with facilitating communication in a wireless network. More particularly, one or more aspects maximize or increase throughput of a wireless network (e.g., a mesh network), while minimizing interference. Typically, access points monitor the current noise level or carrier levels and compare observed levels to a fixed threshold, referred to as the carrier-sensing threshold (CST). If the detected level is below a predetermined threshold, an access point can request permission to transmit using a Request to Send (RTS); otherwise, the access point will refrain from transmitting until the level falls below the carrier-sensing threshold. Consequently, the number of access points that can communicate at any one time is limited based upon the carrier-sensing threshold and configuration of access points.

The network can increase spatial reuse by allowing access points to dynamically set the carrier-sensing threshold and transmission power. In particular, a carrier-sensing threshold can be determined based upon distances between source and destination access points. Access points can exchange received signal strength indicator (RSSI) information, which can be used to compute distances among access points or nodes based upon the exchanged RSSI information. In addition, RSSI can be used to compute interference from hidden nodes as well as transmission power. Dynamic carrier-sensing thresholds can be computed as a function of distances between nodes and transmit power.

In an aspect, the present disclosure provides a method that facilitates communication in a wireless network environment, which comprises obtaining node information related to a neighboring node. The method also comprises determining an appropriate a carrier-sensing threshold to optimize network throughput as a function of the node information. Furthermore, the method comprises controlling data transfer based at least in part upon the carrier-sensing threshold.

In another aspect, the present disclosure provides an apparatus that facilitates network communication. The apparatus comprises a processor that executes instructions for receiving information associated with at least one network node, selecting a carrier-sensing threshold as a function of the received information, and managing network communication based at least in part upon the carrier-sensing threshold. The apparatus also comprises a memory coupled to the processor.

According to yet another aspect, the present disclosure provides an apparatus that facilitates optimization of network throughput, which comprises means for obtaining node data related to a network node. The apparatus also comprises means for setting a carrier-sensing threshold as a function of the node data, wherein the carrier-sensing threshold is utilized to direct data transfers between a source access point and a destination access point.

According to a further aspect, the present disclosure provides a computer-readable medium having instruction for receiving node information from at least one access point, the node information includes signal strength information related to at least one neighboring node of the access point. The computer-readable medium includes instructions for determining a carrier-sensing threshold utilized to manage data transmissions as a function of the received node information.

According to another aspect, the present disclosure provides a processor that executes computer-executable instructions that facilitate network communications. The instructions comprise receiving a periodic signal that includes node information that lists at least one network node and associated signal strength. The instructions can also comprise setting a carrier-sensing threshold as a function of the node information. In addition, the instructions can comprise controlling transfer of data based at least in part upon the carrier-sensing threshold.

To the accomplishment of the foregoing and related ends, the one or more aspects comprise the features hereinafter fully described and particularly pointed out in the claims. The following description and the annexed drawings set forth in detail certain illustrative aspects. These aspects are indicative, however, of but a few of the various ways in which the principles described herein may be employed and the described aspects are intended to include their equivalents.

DETAILED DESCRIPTION

Figure 1:
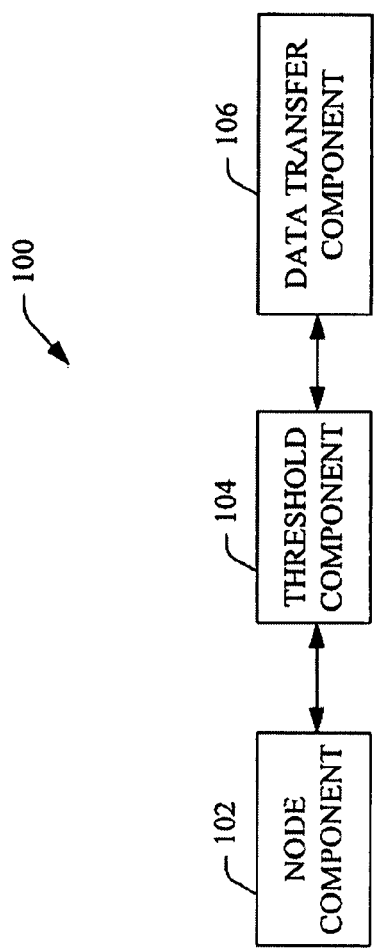
FIG. 1 is a block diagram of a system that dynamically adjusts a carrier-sensing threshold in accordance with one or more aspects presented herein.

Various aspects are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

As used in this application, the terms "component," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a communications device and the device can be a component. One or more components may reside within a process and/or thread of execution and a component may be localized on one computer and/or distributed between two or more computers. Also, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a terminal or client. A terminal can also be called a system, a user device, a subscriber unit, subscriber station, mobile station, mobile device, remote station, access point, base station, remote terminal, access terminal, user terminal, terminal, user agent, user equipment (UE) or client. A terminal can be a cellular telephone, a cordless telephone, a Session Initiation Protocol (SIP) phone, a wireless local loop (WLL) station, a PDA, a handheld device having wireless connection capability, or other processing device connected to a wireless modem.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ).

Many wireless network protocols avoid interference by detecting transmissions by neighboring nodes and refraining from transmitting when such transmissions are detected. In particular, IEEE 802.11a/b/e/g/n systems and Ultra Wide Band (UWB) systems are based on Carrier Sense Multiple Access with Collision Avoidance (CSMA/CA) and Preamble Sensing Multiple Access with Collision Avoidance (PSMA/CA), respectively. In the CSMA/CA algorithm, detection of transmissions of other nodes is based on detection of energy, carrier and/or combination of both. In the PSMA/CA algorithm, detection of transmissions by other nodes is based on detection of the carrier or preamble of a transmission. In both protocols, all nodes that want to transmit or access the medium first sample energy in the medium and determine if another node is already transmitting in the medium. Such sampling helps those systems to determine not only the presence of energy, but to process this energy. Nodes may be able to synchronize with the preamble and pilot (if there was a frame transmission in the air). If the node is able to synchronize with the preamble and pilot, the node can then decode the Media Access Control (MAC) header to determine if there was a frame transmission in the air.

In particular, detection of other transmissions by other nodes can be accomplished by using two carrier-sensing schemes: (1) Physical Carrier Sensing (PCS) and (2) Virtual Carrier Sensing (VCS). In the PCS scheme, access points defer transmissions if the energy in the medium is above a certain predetermined threshold. Using the VCS mechanism, signal or frame exchanges such as Request to Send (RTS) and Clear to Send (CTS) inform all the neighboring nodes to prevent transmission. The VCS scheme can resolve hidden node problems, since any node that receives the CTS refrains from sending whether or not the transmitting access point is aware of the node. As used herein, a hidden node is any node that is unknown to the transmitting node. Consequently, transmissions by hidden nodes can cause interference. Although VCS can resolve problems caused by hidden nodes, VCS can cause problems for exposed nodes. Generally, hidden nodes cause the greatest interference to the intended receiver and are prevented from transmitting by the Network Allocation Vector (NAV) set in the VCS schemes. However, exposed nodes that could be transmitting without causing interference at the receiver are prevented from transmitting because of the VCS, thus decreasing the spatial throughput.

In MESH networks (e.g., the IEEE 802.11s MESH networks), it is advantageous to maximize the number of nodes that can operate simultaneously in order to support higher area throughput. Dynamic carrier/energy sensing threshold and/or transmission power can be used to maximize the number of nodes that communicate simultaneously, optimizing area throughput.

Turning now to the Figures, FIG. 1 depicts an aspect of a system 100 that facilitates communication among a set of wireless access points. Typically, such systems utilize fixed transmit power and carrier-sensing thresholds. However, this results in some nodes refraining from transmitting when they could do so without causing interference, referred to herein as the exposed node problem. By dynamically adjust transmit power as well as the thresholds used by nodes to detect transmission from other nodes, greater numbers of transmissions can occur simultaneously without causing interference. This increase results in an increase in overall throughput for the network.

The system 100 can include a node component 102 that can receive and transmit messages containing data related to neighboring nodes, referred to herein as node information. Node information can include a node address, RSSI and any other information related to a particular node. As used herein, a node is any client, access point, terminal or other device. The messages can be broadcast periodically and can be received by any nearby nodes.

In aspects, the beacon frame defined by IEEE 802.11a/b/g/n MAC protocol can be modified to include such node information. In particular, the message or beacon frame can include RSSI information for neighbor nodes of an access point transmitting the beacon. This modification of the beacon frame for the protocol may only apply to beacon frames for access points in a mesh network, also referred to as Mesh Access Points (MAPs) and Mesh Portals (MPs).

Clients and Wireless STAtions (WSTAs) can connect to MAPs using a first channel and MAPs can connect to each other using a second, different channel, such that forwarding traffic among access points and incoming traffic from clients need not collide. Typically, each MAP periodically sends a broadcast message or beacon frame to its clients. The broadcast message can include management and time synchronization information and can also be transmitted in the forwarding channel to other MAPs. Alternatively, the Media Access Control (MAC) of the MAP can transmit a message or beacon in the forwarding channel. The message can be received and decoded by all nearby MAPs or nodes. The node component 102 of the receiving node can record the node information (e.g., RSSI) contained within the transmitted message and calculate the path loss between the neighbor nodes and the transmitting MAP. RSSIs for a node can be averaged over a number of received messages or beacons using a simple low pass filter. Additionally, that MAP's MAC beacon frame can contain node information related to its neighbors and their RSSIs.

System 100 can include a threshold component 104 that dynamically determines a carrier-sensing threshold. Threshold component 104 can utilize neighbor information obtained by node component 102 to determine an appropriate carrier-sensing threshold to optimize area throughput while avoiding excessive interference. In particular, threshold component 104 can predict interference from hidden nodes as a function of the neighbor information and adjust the carrier-sensing threshold accordingly.

Data transfer component 106 can utilize the computed carrier-sensing threshold to facilitate transmission and reception of data from neighboring nodes. Typically, network protocols (e.g., IEEE 802.11, WLAN protocol) are designed to ensure that the intended receiver has minimal interference from the neighboring nodes or access points. Data transfer component 106 can mitigate the exposed node problem by utilizing the dynamic carrier-sensing threshold (CST) and adjusting transmit power. In addition, data transfer component 106 can include the computed carrier-sensing threshold in transmissions to neighboring nodes. The data transfer component 106 can include a carrier-sensing threshold in the CTS and/or RTS transmissions.

Figure 2:
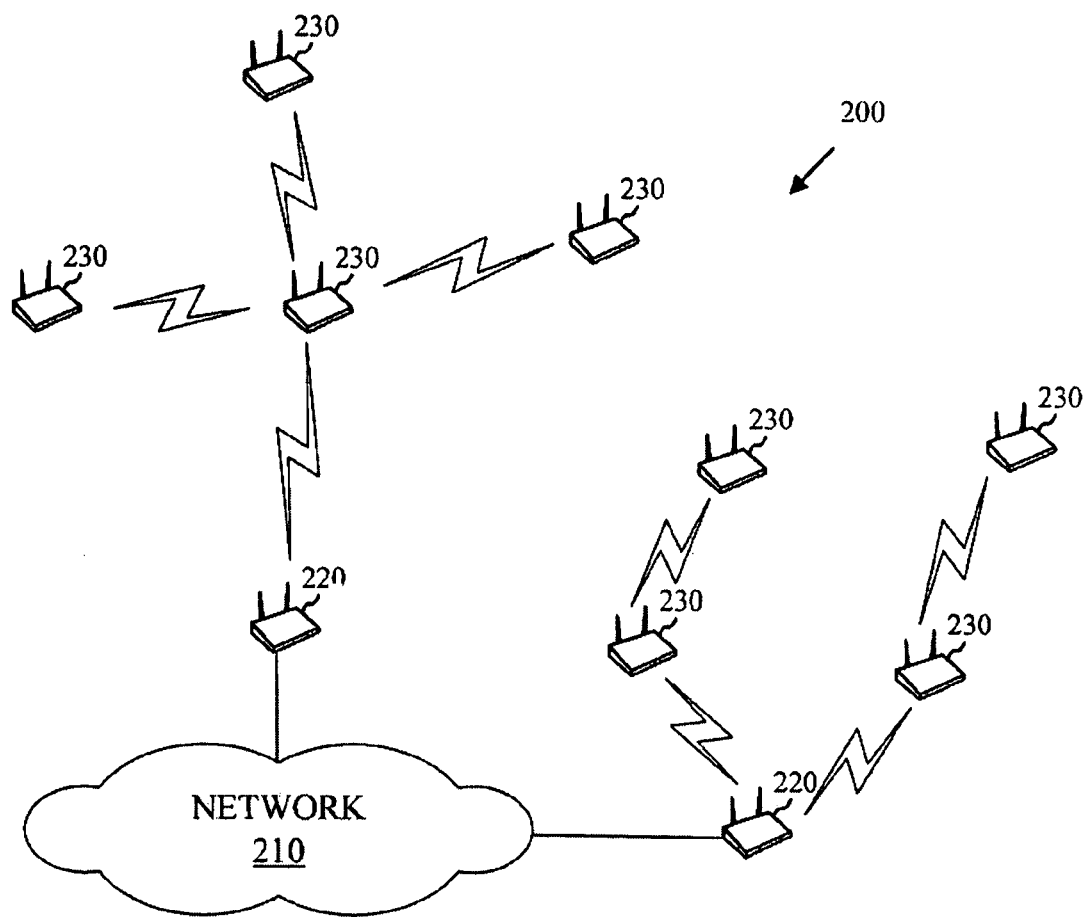
FIG. 2 is a block diagram of an exemplary mesh wireless network in accordance with one or more aspects presented herein.

Referring now to FIG. 2, an exemplary wireless mesh network 200 is illustrated. Network 200 can include a number of access points, also referred to as mesh access points (MAPs) or mesh points (MPs), which may operate according to an 802.11 based or other type of protocol. The access points can be deployed over an area, (e.g., a campus area, urban center, mall or other hot-zone typically characterized by higher population density). To reduce deployment and operating costs, only a subset of access points 220 are connected directly to a wired infrastructure 210 (e.g., a backbone). As a consequence, inter-access point mesh communication is employed to connect unwired access points to the network's backbone.

In a mesh network, mesh access points (MAPs) 230 forward data to the wired access points 220. Frames (or packets) flow from a source to destination in routes that consist of MAPs 230. Routing algorithms can be used to determine the exact sequence of MAPs 230 for a frame to pass through before reaching the destination. If forwarding MAP 230 is congested it may request the other MAPs 230 that forward their traffic to slow down in order to decongest the network 200.

Within the network 200, MAP's 230 and 220 may be designed to operate in two bands simultaneously, (e.g., in a same frame or consecutive frames), using Time Division Duplex (TDD) in each band. In an exemplary scheme for simultaneous communication two separate bands can be utilized. A client access operating band can be used for communications to or from clients. The client band can be provided using the existing 2.4 and/or the 5.x unlicensed bands that are commonly used to support 802.11b,g,n and 802.11a,n devices. An access point 220 or 230 operating on a single 20 MHz carrier can form a Basic Service Set (BSS) with the clients that are registered with it. Different BSSs can operate in an uncoordinated manner and can be deployed on the same carrier or on distinct RF carriers. Client access can be standard 802.11-based.

A separate AP wireless interconnect operating band can be utilized for communication among MAPs. Since only a fraction of MAP's are connected to the wired infrastructure, the interconnect between unwired and wired MAP's is facilitated by operating on a separate carrier from the band used for client access. In addition, it is possible to operate the access point interconnect network in a licensed band that permits higher transmit power than allowed in the unlicensed bands. AP-AP interconnect can be based on similar technology as that used in 802.11n. The exemplary system allows for the use of one band essentially for MAP to client or terminal communication while the other is used essentially for communication among MAPs.

In general, all AP's can provide 802.11-based service in the unlicensed band. The APs can provide access on a single 20 MHz carrier or multiple 20 MHz carriers. For the AP interconnect network there are two basic AP types in the network hierarchy: routers and gateways. A router is an MAP that can be deployed without a wired backbone connection. Routers can operate on a separate dedicated carrier (possibly licensed) that is used exclusively to communicate with an AP Gateway. A gateway is wired AP operating on a separate dedicated carrier (again, possibly licensed) used exclusively to communicate with routers that have associated with it.

The Institution of Electrical and Electronic Engineers (IEEE) is developing a Wireless Local Area Network (WLAN) standard that promises a scalable and easily deployable mesh-network infrastructure based on 802.11 technologies. The objectives include adaptive and auto-configuring systems that support broadcast, multicast, and unicast transport over multihop mesh topologies. A major issue in developing an efficient IEEE 802.11s MESH WLAN is optimizing the spectral reuse and hence maximizing its area throughput.

Figure 3:
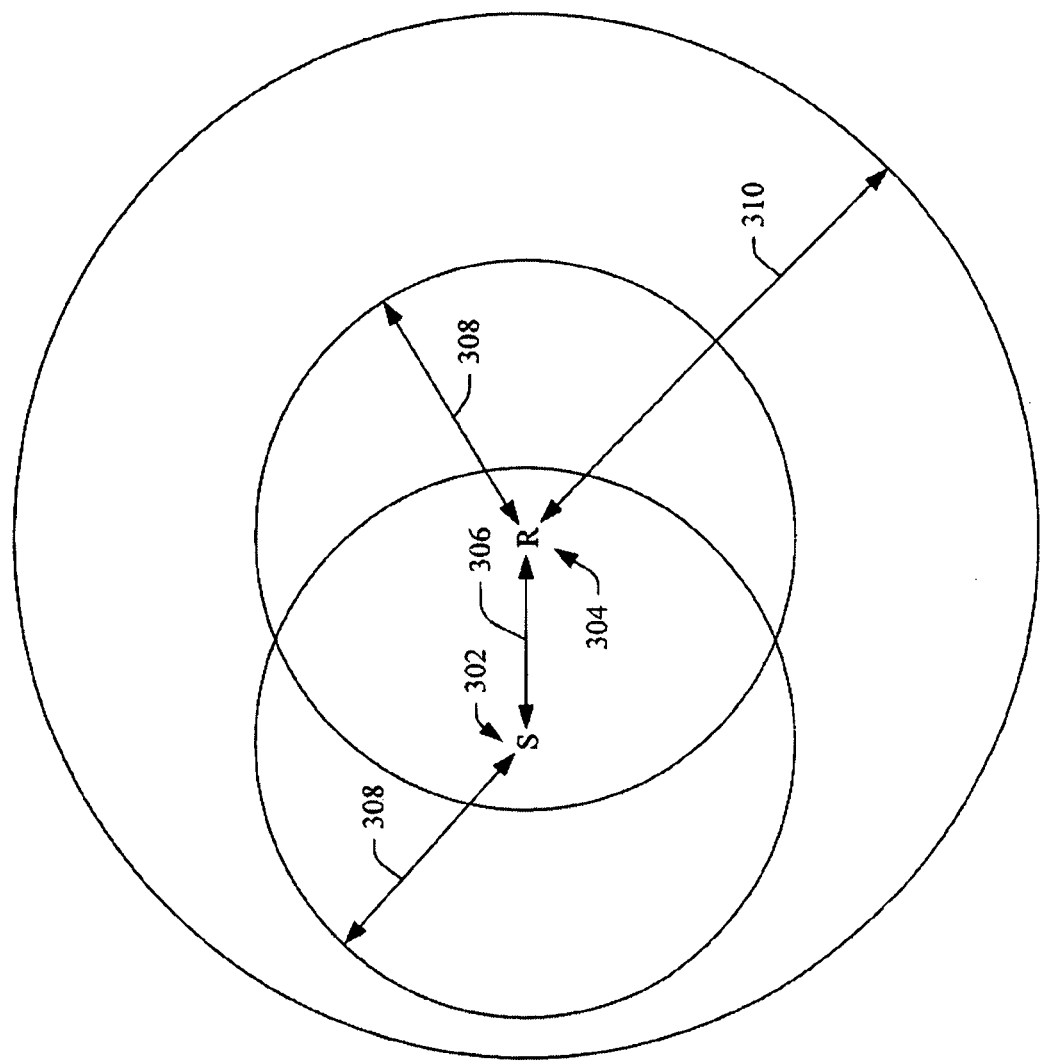
FIG. 3 illustrates relevant ranges for wireless network communications.

Turning now to FIG. 3, several important ranges for wireless network communications are illustrated. A source node 302 and destination node 304 are separated by a distance 306, referred to as the source/destination distance. The transmission range 308 is defined as the range where the signal power at the receiver is above a certain threshold for proper decoding of the frame of size L. The interference range 310 represents the range within which nodes are able to interfere with the receiver and corrupt received frames. The NAV set range (not shown) is the range within which the wireless stations can set the NAVs correctly based on the Duration/ID information carried in the RTS/CTS frames and will not interfere with the subsequent Data/Ack frame exchange between the source node 302 and the destination node 304.

The Clear Channel Assessment (CCA) busy range (not shown) represents the range within which nodes can physically sense that the channel is busy during the data transmission and defer their own transmission attempts. There are two methods for a node to report CCA busy in IEEE 802.11n. One is based on carrier detection (−82 dBm), and the other is based on energy detection, (−62 dBm) by which a node will report a busy medium upon detection of any signal power above the ED (Energy Detection) threshold. Depending on the thresholds set, the radii of these ranges vary. In IEEE 802.11n PHY, the maximum transmit range is the distance wherein a decoder of the receiver will be able to receive a signal with power above −91.44 dBm, thus achieving a SINR greater than 0.6 dB. In order to determine the interference range, we consider the worst-case scenario.

Depending on various thresholds set, the radii of these ranges vary. In IEEE 802.11n PHY, the maximum transmit range is the distance wherein a decoder of the receiver will be able to receive a signal with power above −91.4 dBm thus achieving a SINR greater than 0.6 dB. To determine the interference range, the worst-case scenario can be analyzed.

Figure 4:
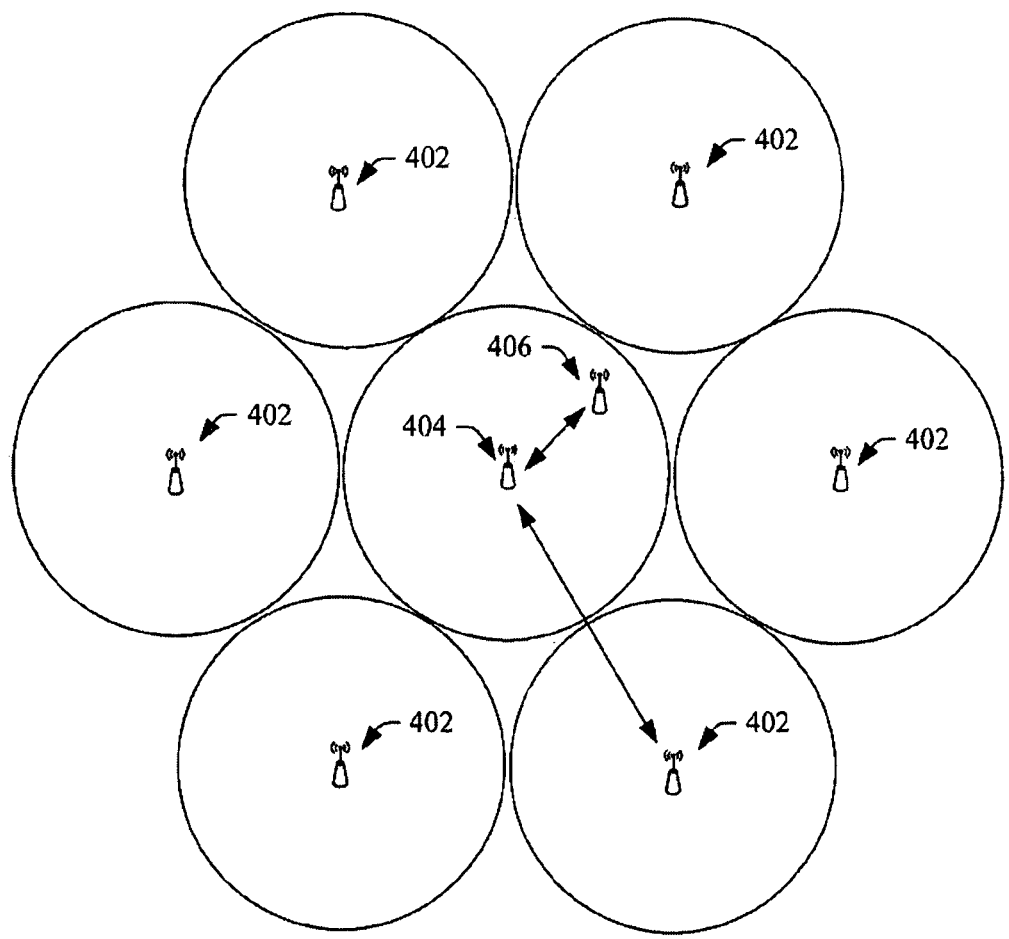
FIG. 4 illustrates an exemplary interference scenario for a wireless network.

FIG. 4 illustrates a worst-case scenario, where there are six interferers or potential interferers 402 surrounding a receiver 404 in communication with another node 406. The terms interferer and potential interferer are used interchangeably herein. The interferers 402 can be transmitting simultaneously and have the same, fixed transmit power. For simplicity, it may be assumed that the distance between all interferers 402 and the receiver 404 is same and the noise power can be ignored. This scenario can be referred to as the interference limited regime, since interference power dominates noise power.

Figure 5:
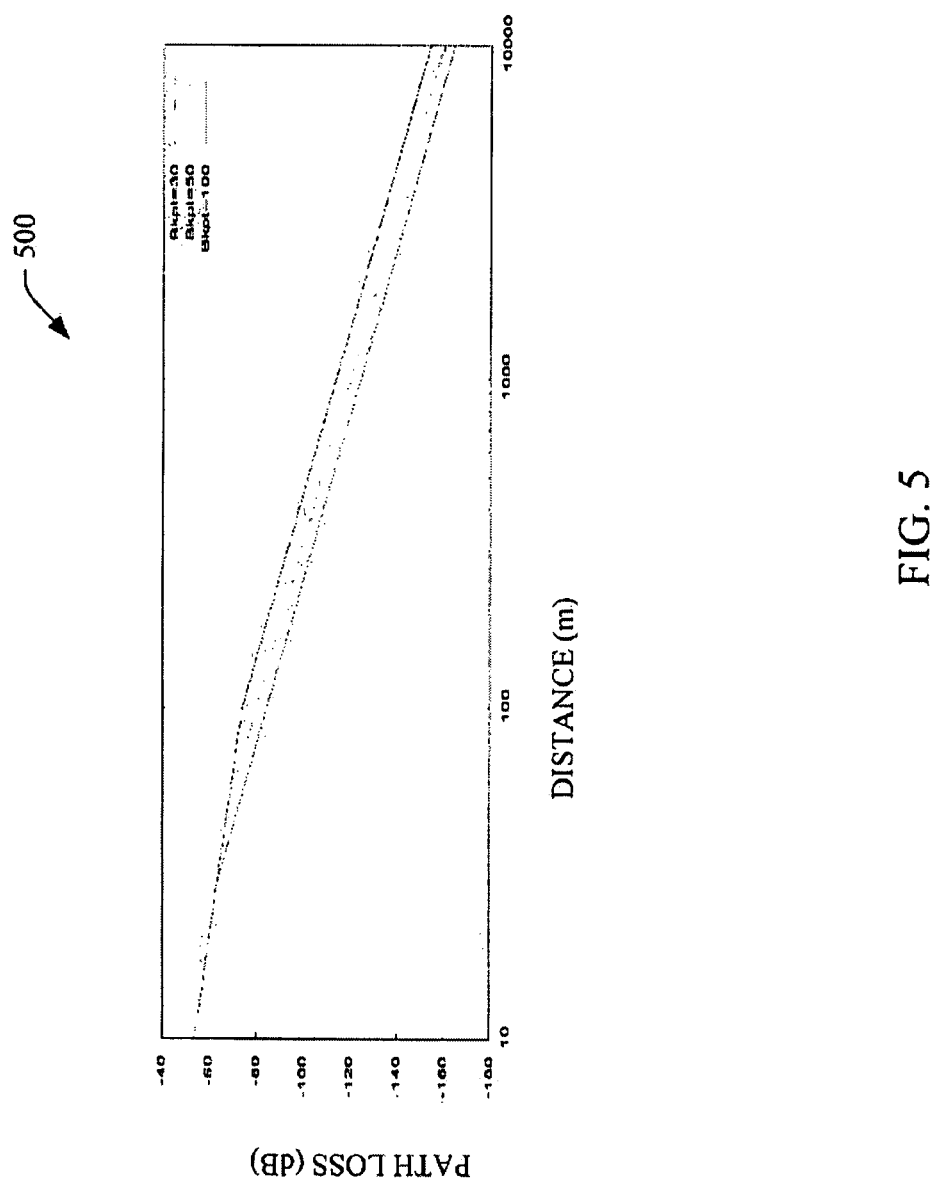
FIG. 5 is a graph depicting an exemplary path loss model.

Turning now to FIG. 5, a graph 500 depicting an exemplary path loss model is illustrated. Path loss has a significant impact on interference analysis. Path loss at distance d (or the received power at distance d) may be modeled by a two slope model with breakpoint as follows:

$$PL(d) = \alpha * d^{n_1}, \text{ if } d \leq R_B \tag{1}$$

$$PL(d) = \alpha * R_B^{n_1}\left(\frac{d}{R_B}\right)^{n_2}, \text{ if } d > R_B$$

This model may be representative of realistic WLAN indoor environments. Here $$a = \frac{4\pi f}{c}.$$

f is the carrier frequency, c is the speed of light, (n1, n2) are the two path loss coefficients and $R_B$ is the breakpoint distance.

If both the distance between the intended receiver and the transmitter, d, and the minimum distance between an interferer and the intended receiver distance, $D_{min}$, is beyond the breakpoint of the path loss model, then one or more known calculations may be applied. For example, using the calculations as in cellular networks:

$$D_{min} \geq \sqrt[n_3]{6 * 10^{\frac{SINR}{10}}} * d \tag{2}$$

Higher physical transmission rates would require very high SINR at the receiver. Therefore, a large area around the receiver may be prevented from transmitting or 'NAV'ed out. If the SINR requirement is small, then the potential interferers can be kept close to the receiver. Additionally, $D_{min}$ is dependent upon the distance between the transmitter and the receiver.

If the intended distance between the receiver and transmitter, d, is less than the breakpoint distance and the intended receiver/interferers distance is greater than the breakpoint then a different formula can be used to calculate the interference distance, $D_{min}$:

$$D_{min-BP} \geq \sqrt[n_2]{6 * 10^{\frac{SINR}{10}} (d * R_B)^{n_1}} \quad (3)$$

This formula indicates the interference distance is also a function of the breakpoint distance $R_B$.

Table I includes exemplary computations of interference distances based upon PHY rates. The values included in the table are representative and may vary for different propagation environments. In particular, the table includes worst and best case interference distances, $D_{min}$, using the rate table of IEEE 802.11n for operating at a particular PHY rate. In Table, column 5 shows that the maximum transmit radius, Rmax to operate a link at a particular PHY rate using a transmit power of 23 dBm. Column 6 contains the ratio of the minimum interference distance to the transmitter receiver distance for each PHY rate using Eqn. (2). The ratio is different for different PHY rates because of different SINR requirements. Column 7 indicates the best case scenario using Eqn. (5). These ratios remain fixed and are a function of source destination distance, but are independent of the transmit power. The rate table is for a single stream. Some of the rates are similar to IEEE 802.11a/g to maintain backward compatibility. Additional code rates are introduced to provide enhanced spectral efficiency, including the use of 256 QAM. A maximum of four spatial streams is supported.

TABLE I

Determination of the maximum transmit radius (Rmax) and minimum interference distance (Dmin) for different PHY rates in IEEE 802.11n

| SNR | RATE (Mb/s) | Modulation | Code Rate | Rmax w/ breakpoint = 30 m And Transmit Power = 23 dB | X = Dmin/R Eqn. (2) | X = Dmin/R Eqn. (5) |
|---|---|---|---|---|---|---|
| 27.0 | 84 | 256-QUAM | 7/8 | 42 | 8.71 | 5.37 |
| 24.9 | 72 | 256-QUAM | 3/4 | 49 | 7.64 | 4.71 |
| 20.3 | 60 | 256-QUAM | 5/8 | 60 | 5.74 | 3.56 |
| 19.0 | 54 | 64-QUAM | 3/4 | 65 | 5.29 | 3.26 |
| 17.6 | 48 | 64-QUAM | 2/3 | 70 | 4.85 | 3.00 |
| 16.5 | 42 | 64-QUAM | 7/12 | 76 | 4.53 | 2.79 |
| 13.0 | 36 | 16-QUAM | 1/2 | 87 | 3.64 | 2.25 |
| 11.5 | 30 | 16-QUAM | 5/8 | 100 | 3.32 | 2.05 |
| 10.0 | 24 | 16-QUAM | 3/4 | 112 | 3.02 | 1.86 |
| 6.3 | 18 | QPSK | 1/2 | 137 | 2.41 | 1.49 |
| 3.6 | 12 | QPSK | 3/4 | 163 | 2.03 | 1.25 |
| 2.1 | 9 | BPSK | 3/4 | 180 | 1.85 | 1.14 |
| 0.6 | 6 | BPSK | 1/2 | 193 | 1.68 | 1.04 |

Figure 6:
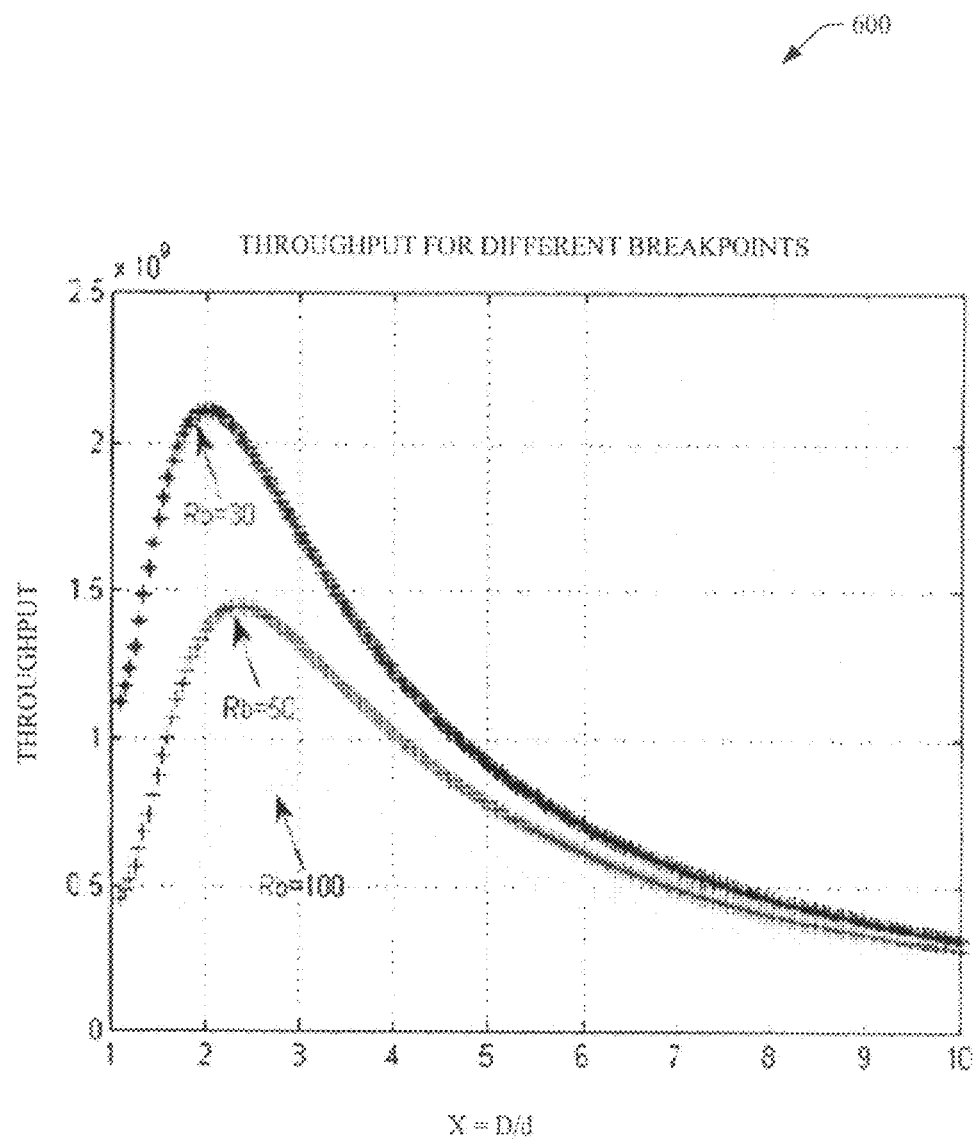
FIG. 6 is a graph depicting area throughput based upon path loss breakpoint values.

Referring now to FIG. 6, a graph 600 depicting various area throughputs for different breakpoint values is illustrated. For a square of area $A=L^2$ meters, the maximum number of successful simultaneous transfers or transmission, such that all links have the same physical transmission rate can be computed as a function of the interference distance. In order to carry out this analysis, the distance, Dmin, between interferers and transmitter can be determined. Distance between interferers can be obtained from Eqn. (2) or Eqn. (3), above. Horizontal distance between two interferers is denoted by $D_{min}$ and the vertical distance between interferers is equal to $$\frac{\sqrt{3}}{2} D_{min}.$$

The maximum number of simultaneous transfers in an area, A, can be computed as follows:

$$N_{max} = \frac{2L^2}{\sqrt{3} D_{min}^2} \quad (4)$$

Here, Nmax was derived based on the worst-case interference assumption, where six interferers surround the receiver node. The best-case scenario occurs when there is only one interferer. In the best-case scenario equations (2) through (4) above can be modified as follows:

$$D_{min}^{best} \geq \sqrt[n_2]{10^{\frac{SINR}{10}} * r} \quad (5)$$

$$D_{min-BP}^{best} \geq \sqrt[n_2]{10^{\frac{SINR}{10}} R_B r} \quad (6)$$

$$N_{max}^{best} = \frac{2L^2}{\sqrt{3} (D_{min}^{best})^2} \quad (7)$$

Figure 7:
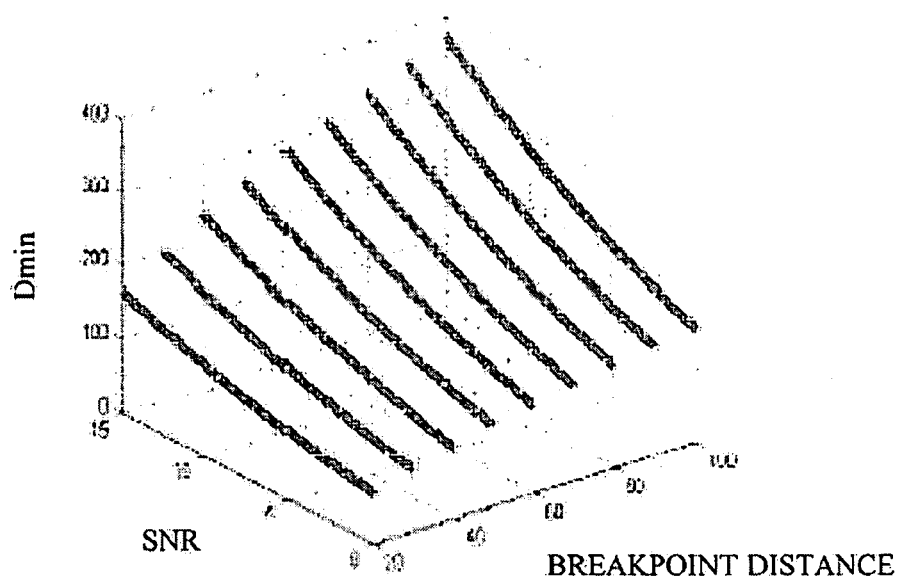
FIG. 7 is a graph depicting interference distance as a function of required SINR and path loss breakpoint distance.

Turning now to FIG. 7, a graph 700 depicting interference distance as a function of required SINR and path loss breakpoint is illustrated. In order to understand the impact of breakpoint on throughput, Shannon's capacity equation, based upon the Shannon-Hartley Theorem, can be used to calculate the area throughput as follows:

$$S_{theoritical} = N_{max} B \log_2(1 + SINR)$$

The area throughput and impact of breakpoint and SINR on Dmin is illustrated in FIG. 7 and Table II, below. Moreover, it is clear from Table II that the area throughput increases when the breakpoint distance is decreased. The power of the interfering signal decays to the power four after the breakpoint, leading to lower interference at the intended receiver due to the fact that the interferer/receiver distance is much greater than the transmitter/receiver distance. For each breakpoint there is an optimal interference distance, Dmin, ranging between two or three times the distance between transmitter and receiver. Also from Table II, it is clear that larger breakpoints and larger SINR requirements increase the value of Dmin. Larger SINR requirements arise from operating the intended node at higher PHY rates and larger breakpoints result in additional interference power at the intended receiver.

TABLE II

Area throughput for the best and worst case scenarios using a source destination distance of 40 meters.

| Rate (Mb/s) | X = Dmin/Ft Eqn. (2) (worst-case) | Number of Simultaneously Operating Nodes | Area Throughput (Worst-Case) Mbps |
|---|---|---|---|
| 84 | 8.71 | 38.045 | 1357.7 |
| 72 | 7.64 | 49.414 | 1644.1 |
| 60 | 5.74 | 87.599 | 2662.6 |
| 54 | 5.29 | 102.984 | 2959.6 |
| 48 | 4.85 | 122.588 | 3298.3 |

TABLE II-continued

Area throughput for the best and worst case scenarios using a source destination distance of 40 meters.

| Rate (Mb/s) | X = Dmin/Ft Eqn. (2) (worst-case) | Number of Simultaneously Operating Nodes | Area Throughput (Worst-Case) Mbps |
|---|---|---|---|
| 42 | 4.53 | 140.575 | 3495.6 |
| 36 | 3.64 | 217.318 | 4908.1 |
| 30 | 3.32 | 261.925 | 5242.0 |
| 24 | 3.02 | 315.689 | 5396.4 |
| 18 | 2.41 | 494.144 | 6795.0 |
| 12 | 2.03 | 700.173 | 69221.0 |
| 9 | 1.85 | 843.891 | 6510.9 |
| 6 | 1.68 | 1017.1 | 5453.7 |

The realistic throughput of the system, considering a packet size Lpacket and overheads arising from adding header to each packet as well as the backoff overheads, in a given area A can be computed as follows:

$$S = N_{max} \frac{L_{packet}}{T + T_{backoff} + \frac{L_{packet} + H}{R}} \quad (8)$$

where $T=2T_{preamble}+\text{Tack}+\text{TIF S}+\text{TSIF S}$. Here, T represents the fixed overheads that are specified by the standard and $T_{backoff}$ represents the average backoff value, $L_{packet}$ the frame in bits and H represents the overheads due to MAC and higher layers added to the information in bits. R is the function of the SINR acquired at the receiver. $T_{preamble}$ is further given by $T_{preamble}=\text{TP LCP preamble}+\text{TP LCP sig}=20 \text{ }\mu s$. Considering different modulation and coding schemes and neglecting the overheads due to higher layers, the Eqn. (8) can be simplified as follows:

$$S = N_{max} \frac{L_{packet}}{T + T_{backoff} + \frac{288 + L_{packet}}{R}} \quad (9)$$

Here H is equal to 288 bits. Ignoring the exponential backoff (assuming that there is only one stage in the backoff process), $T_{backoff}$ is equal to 72 µs. However, this value of $T_{backoff}$ is just indicative and assumes that there is only one backoff stage. Exact value of the $T_{backoff}$ is a function of number of stations, number of backoff stages and priority. Tack, TSIF S, TIF S are given as 28 µs, 16 µs, and 34 µs respectively. So the Eqn. (9) can be written as follows:

$$S = N_{max} \frac{L_{packet}}{190 \text{ }\mu s + \frac{288 + L_{packet}}{R}} \quad (10)$$

Table II depicts maximum area throughput that can be obtained using the worst-case interference equations for a source destination distance of 40 meters and using the path loss model shown in FIG. 5. Higher PHY rates require very high SINR at the receiver. Therefore, the carrier sensing threshold can NAV out more nodes resulting in lower area throughput. Conversely, lower PHY rates result in large carrier sensing threshold, resulting in more active nodes and higher interference tolerance at the intended receiver. If the key criterion for MESH network design is fairness, then lower PHY rates can be elected. If quality of service is more important, higher PHY rates can be selected, resulting in a lower number of active nodes. It can be inferred that operating at PHY rate of 12 Mbps yields the optimal throughput as it balances between higher number of active nodes and operating each active node at higher PHY rate.

Looking again at the example system, for a source destination distance of 40 meters, the carrier sensing range can be set to cover a distance of 348.4 meters to achieve a PHY rate of 84 Mbps. A carrier-sensing range can be sent to cover a distance of 67 meters to achieve a PHY rate of 6 Mbps. To achieve the 84 Mbps, the nearest interferer can sense the signal at 93.15 dBm (assuming a transmit power of 23 dBm and transmitter/receiver distance of 40 meters). However, this may be impossible if devices cannot decode a signal below 82 dBm. Typically, WLAN devices can sense the signals at 92 dBm in the radio frequency (RF) front-end; however, the fixed implementation loss of 10 dB further reduces the signal power available for the decoder, which determines what was transmitted.

Figure 8:
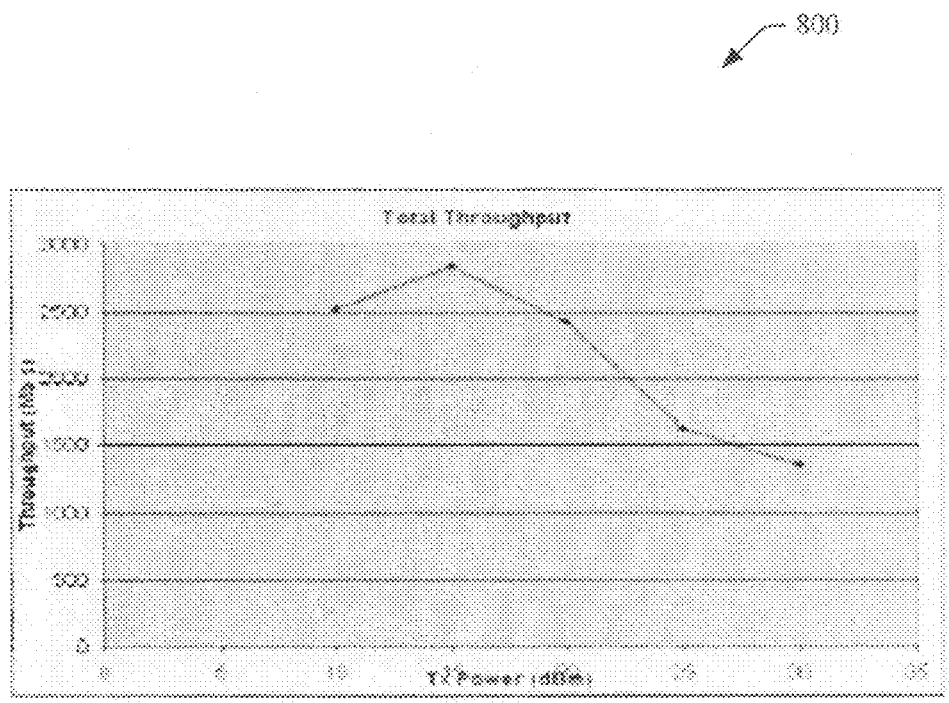
FIG. 8 is a graph depicting effects of transmit power on area throughput.

Referring now to FIG. 8, a graph 800 depicting effects of transmit power on area throughput is illustrated. The path loss calculations based on the Eqn. (2) are independent of the node's transmit power. However, if a larger transmit power is used, the coverage area of the signal directing nodes to refrain from transmitting would be larger. Consequently, the number of simultaneous transmissions would be reduced. Conversely, if a smaller transmit power is used, the coverage area would be smaller. This would allow more nodes to communicate simultaneously, thereby increasing the spatial reuse as well as potential interference. At large transmit powers, it is clear that the RTS/CTS messages will be decoded by many other neighboring nodes over a large area thus "NAVing out" more nodes and reducing the spatial reuse. Also, a large transmit power provides larger radii of communication between a source and destination pair to maintain a particular PHY rate. Conversely, a smaller transmit power provides smaller radii of communication between a source and destination pair to maintain a particular PHY rate.

To better understand this effect, an exemplary network simulation can be analyzed. In a simple simulation, IEEE 802.11n/s MESH WLANs nodes are placed at the edges of hexagonal cell with the radius of the hexagon set to 100 meters. Nodes can be deployed such that each node has six neighbors in a geographic area of 4000×4000 square meters. It is also assumed that the sender is at (0, 0) and is communicating to the receiver located at (100, 0). The results on area throughput and effect of power and active node density are shown in the FIG. 8. Here, the transmit powers for the nodes are varied between 10 and 30 dBm. A higher transmit power at each node results in RTS/CTS mechanism of IEEE 802.11n NAVing out greater areas.

To further understand the effect of transmit power control, transmit power can be modeled as a function of rise over thermal. Rise over thermal (ROT) can be defined as follows:

$$ROT = \frac{P_{Thermal} + P_{Interference}}{P_{Thermal}} \quad (11)$$

It can be inferred that ROT is a function of the load around the receiver that contributes to interference. Assuming that the intended source and destination nodes would like to communicate at a PHY rate, i, and assuming a simple distance based path loss, the transmit power required to achieve a certain PHY rate between the source and destination can be calculated using the following exemplary formula:

$$P_{TPC}^i = \frac{SINR(i)(P_{Thermal} + P_{Interference})}{d^{-\gamma}} \quad (12)$$
$$= P_{Thermal} * SINR(i) * ROT * d^{\gamma}$$

In the above equation, $P_{TPC}^i$ is the optimal transmit power at the transmitter to achieve a particular PHY rate with the intended receiver, and SINR(i) is the minimum required SINR to achieve a PHY rate, i. From the above equation, it is clear that if the ROT were greater than one, then more power would be required to counter the interference. If ROT were equal to one, then the system would be operating with zero interference. If the ROT is closer to one, then the above equation can be used to decrease the power of the transmitter since the interference seen at the receiver is minimal.

As indicated in the preceding paragraphs, the transmitter/receiver distance plays an important role in setting the carrier-sensing threshold. Consider a simple example. If the source destination pair separated by a distance of 40 meters were to operate at 84 Mbps, then nodes outside the interfering range $D_{min}$=348.4 should be allowed to transmit (assuming a regular layout and a worst-case interference from six other transmitters as shown in FIG. 4). As indicated earlier, typically nodes cannot decode transmissions below −82 dBm or −81.4 dBm to properly decode the duration ID in the RTS/CTS frame. Therefore, transmit power can be increased such that an interfering node placed at 348.3 meters can receive the transmitted signal at −81.4 dBm and refrain from transmitting for the receiver to receive the signal using 84 Mbps PHY rate. The path loss equation can be used to determine the transmit power. In this example, the CTS can be transmitted at 34.77 dBm (or 3 Watts), which is above the limits set for transmissions in 2.4 GHz or 5 GHz. Alternatively, this suggests that using a transmit power of 23 dBm, one can never achieve 84 Mbps under current protocols.

An optimal carrier-sensing threshold can be computed based upon distance between the source and destination nodes, and path loss. A ratio, y, can be defined as a ratio of the receive sensitivity at a particular modulation scheme (RS(i)) to the receive sensitivity at 6 Mbps (RS(6)) which is also the carrier sensing threshold (CSthresh=−84 dBm). It has been determined that:

$$P_T D_{min}^{-\gamma} = CS_{thresh} \quad (13)$$

$$P_T r^{-\gamma} = RS(i) \quad (14)$$

Here, $P_T$ represents transmission power, distance between source and destination is represented by r and γ denotes path loss. Rearranging the above equations, y can be represented as follows:

$$y = \frac{RS(i)}{CS_{thresh}} = \left(\frac{D_{min}}{r}\right)^{\gamma} = X^{\gamma} \quad (15)$$

Here, $$X = \frac{D_{min}}{r}.$$

Since X varies for different PHY rates, $X_i$ will be used to refer to a particular PHY rate $R_i$. $X_i$ is a constant for a particular PHY rate $R_i$. Since $X_i$ is a constant, $y_i$ is also constant for a particular PHY rate. Here, $y_i$ refers to a value of y for a particular PHY rate Ri. The previous equation can be modified to yield:

$$\frac{P_T r^{-\gamma}}{y_i} = CS_{thresh} = \frac{P_R}{y_i} \quad (16)$$

Here, $P_R$ is the received power at the intended receiver due to transmission of an RTS frame by a sender or source node. The intended receiver can determine the corresponding PHY rate at which the sender wishes to communicate and use that information to respond by transmitting a CTS frame at power given by:

$$P_T^{CTS} = CS_{thresh}(D_{min}^i)^{\gamma} \quad (17)$$

The above equation assumes that the sensing capability of WLAN can be in the range above −81.4 dBm. The index for the term $D_{min}^i$ denotes that different PHY rates will have a different interference distance, $D_{min}$, and hence the carrier-sensing threshold varies as a function of the distance between sender and receiver.

Figure 9:
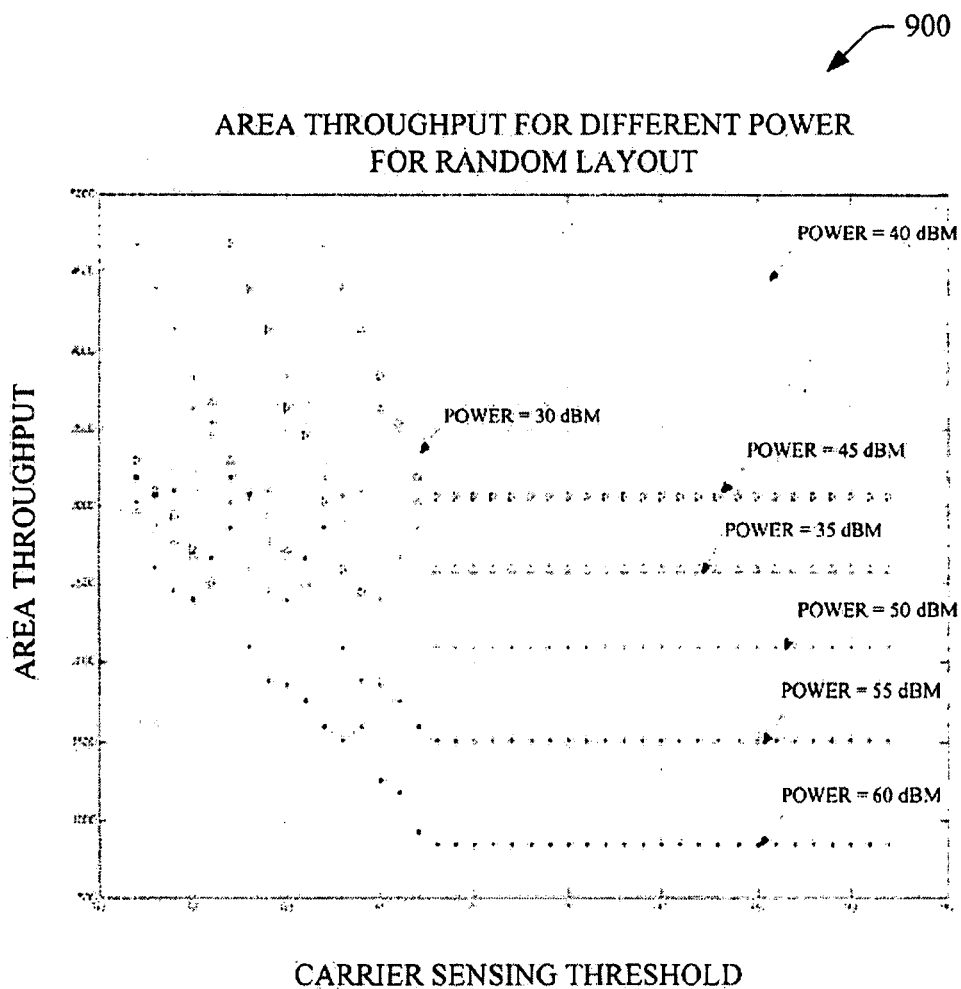
FIG. 9 is a graph illustrating area throughput as a function of carrier sensing threshold.

FIG. 9 depicts a graph 900 illustrating area throughput as a function of carrier sensing threshold. To further enumerate the performance of the above-mentioned carrier-sensing threshold, a simple simulation can be performed for a random layout of nodes in Matlab. During the simulation, the source is kept at [100, 0] and the destination is kept at [0, 0]. The path loss model of FIG. 5 is chosen to represent a realistic simulation. It is clear from FIG. 9 that higher transmit powers with lower carrier sensing thresholds yields lower area throughput. The effect is based upon the fact that higher powers with lower carrier sensing thresholds NAV out a large geographical area, resulting in fewer active nodes at any time. If one uses lower powers with the same carrier-sensing threshold, the area throughput improves because more nodes are allowed to transmit simultaneously. Small transmit powers and very high carrier sensing threshold yields highest area throughput. If the transmit power is fixed, there is an upward jump beyond a certain carrier sensing threshold. This is because the operating rate for a threshold falls dramatically given the SINR constraint. This also suggests that choosing a carrier-sensing threshold is complicated, but yields advantages for a typical random layout of nodes. It is also clear that increasing the carrier-sensing threshold yields the benefits of reducing the coverage area. Since the considered source destination pair is kept at 100 meters, any carrier sensing range that would reach the receiver is not considered in the above simulation.

Figure 10:
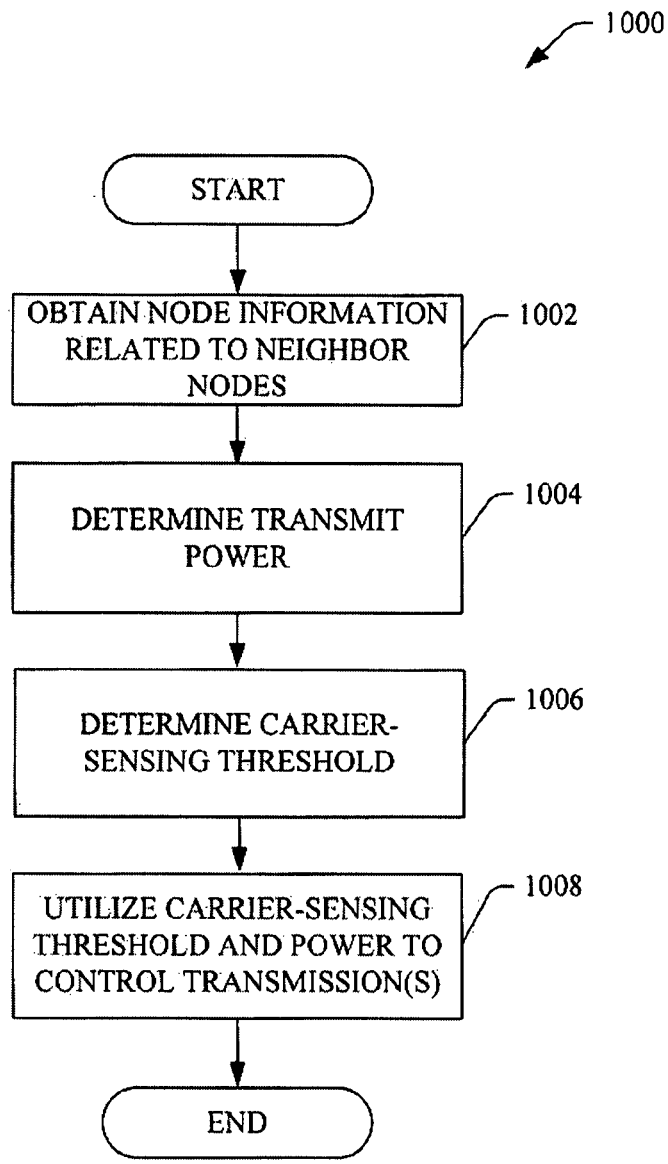
FIG. 10 illustrates an exemplary methodology for setting carrier-sensing thresholds to optimize communications in a wireless network in accordance with one or more aspects presented herein.

FIG. 10 illustrates an exemplary methodology 1000 for setting carrier-sensing thresholds to optimize communications in a wireless network in accordance with one or more aspects presented herein. At 1002, node information related to neighbor nodes can be obtained. Node information can include node addresses, RSSIs or any other information related to nodes. In aspects, access points can broadcast node information periodically, such as in a beacon frame. Relative distances between the receiving access point and nodes can be computed based upon the node information.

At 1004, transmit power can be determined as a function of the obtained node information. Transmit power can be adjusted to ensure that a target access node receives transmissions. Additionally, transmit power can be determined to ensure that nodes within an interference distance are notified to refrain from transmitting. Nodes beyond the interference distance can transmit without their transmissions effecting reception at the destination node. The length of a signal to other nodes can be selected to control the length of time nodes will refrain from transmitting.

At 1006, a carrier-sensing threshold can be computed. The carrier-sensing threshold can be determined such that transmissions below the threshold will not affect reception and decoding of transmission from a source node. At 1008, the computed transmit power and carrier-sensing threshold can be utilized to control data transmissions for an access node. Dynamically adjusting threshold and transmit power allows an optimal number of access points to communicate concurrently.

Figure 11:
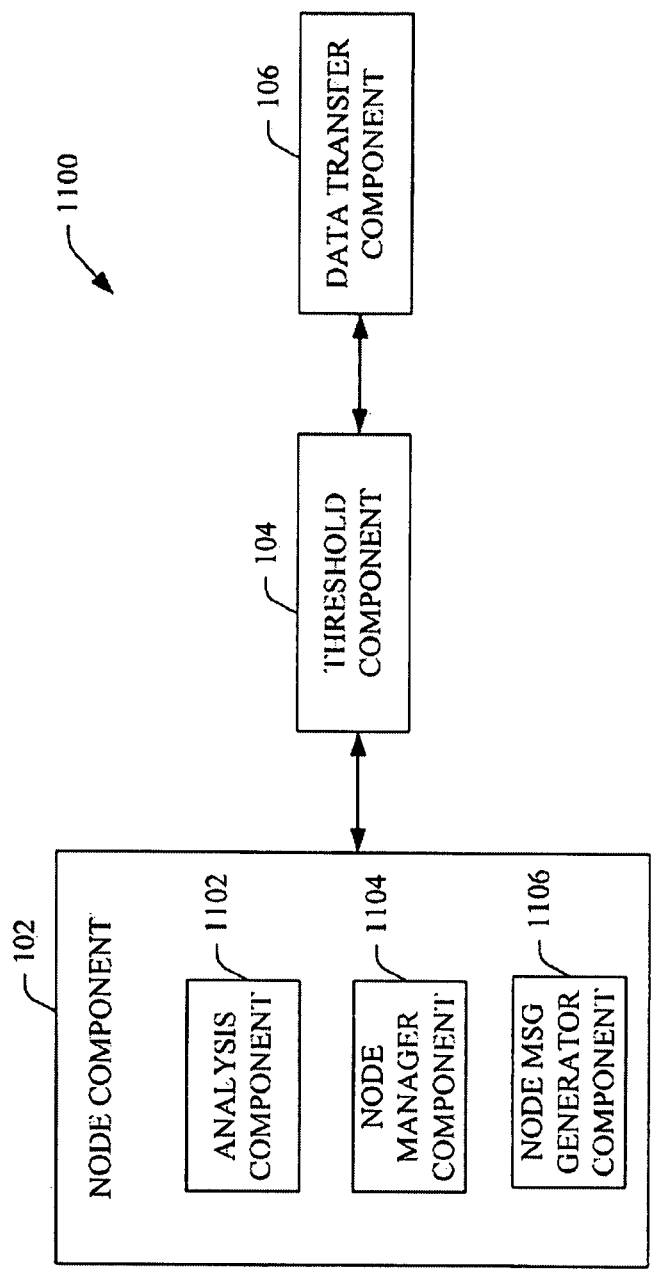
FIG. 11 is a block diagram of a system that obtains and provides neighbor information in accordance with one or more aspects presented herein.

Referring now to FIG. 11, an aspect of the communication system illustrated in FIG. 1 is depicted. Node component 102 can include an analysis component 1102 that analyzes signals (e.g., broadcast or beacon frames) received from neighboring access points. In particular, analysis component 1102 can determine an RSSI for the received signal. In addition, analysis component 1102 can determine path loss between the transmitting node and the current access point. Analysis component 1102 can also evaluate received signals to obtain node information contained within the signals.

Node manager component 1104 can maintain RSSI or other signal information, including node information, path loss computations, distance computations, computed received power from each node as well total power and any other related information. Node manager component 1104 can update maintained information, add or delete information as additional signals are received and analyzed.

Node message generator component 1106 can generate messages including node information to be transmitted to other access points. The node information can be included in broadcast messages and transmitted periodically. In particular, node information can be included in a beacon frame.

Figure 12:
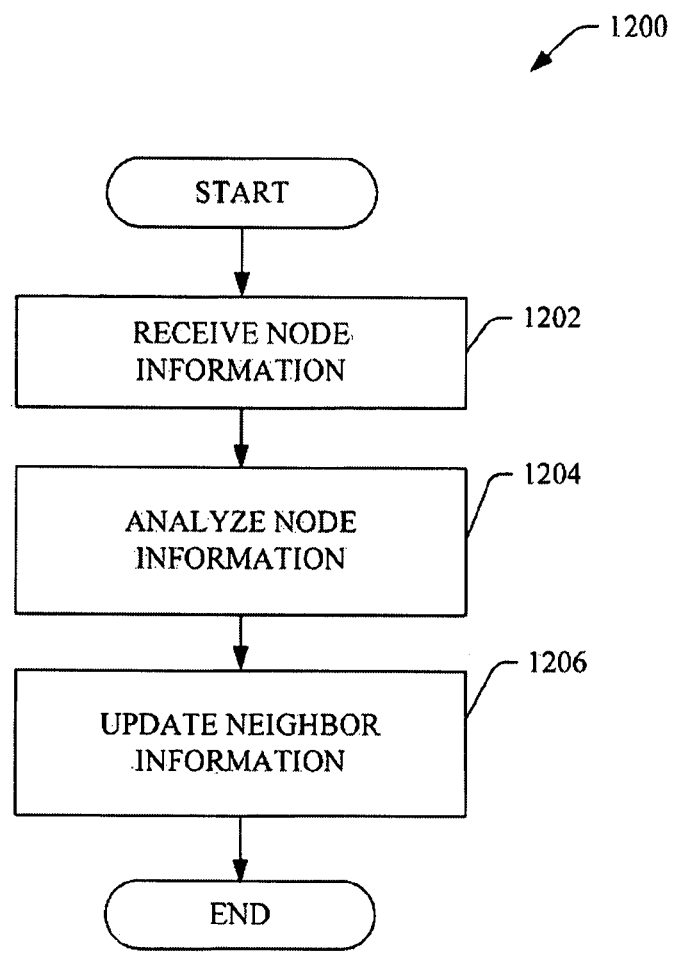
FIG. 12 illustrates a methodology for obtaining and managing node information in accordance with one or more aspects presented herein.

FIG. 12 illustrates an aspect of a methodology 1200 for obtaining and managing node information. At 1202, a transmission including node information is received. The transmission can be broadcast periodically, or can be transmitted upon request. Node information can include data related to a set of nodes proximate to the access point transmitting the node information. In particular, node information can include node addresses as well as RSSI indicative of strength of signals received at the transmitting access point from the nodes.

At 1204, the received transmission and node information can be analyzed. In particular, RSSI from the received transmission can be determined. Furthermore, path loss from the transmitting node can be determined. The received transmission can be parsed and node information can be added to a set of node information maintained at an access point at 1206. Data associated with a particular node can be updated for each received transmission. Any new nodes can be added to the set of node information. In addition, if no information has been received for a particular node for a period of time, it can be inferred that the node has moved out of range or otherwise ceased transmissions. The node information associated with such nodes can be deleted from the set of maintained node information.

Figure 13:
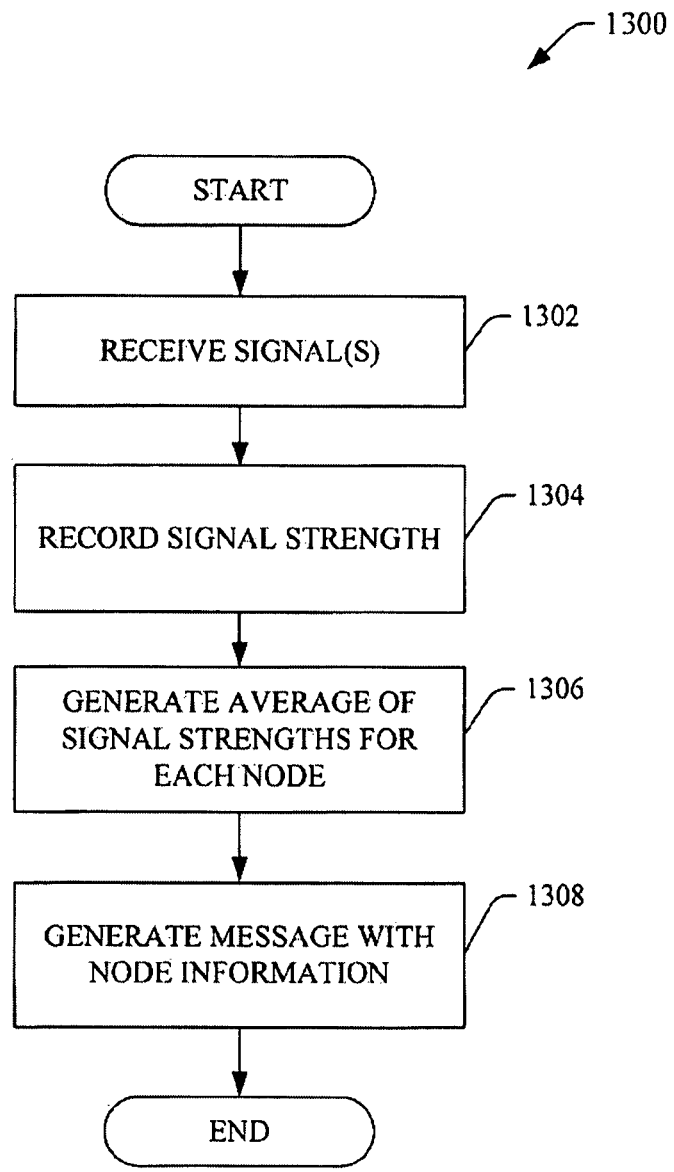
FIG. 13 illustrates a methodology for generating a broadcast message containing node information in accordance with one or more aspects presented herein.

FIG. 13 illustrates an aspect of a methodology 1300 for generating and transmitting node information. At 1302, one or more signals can be received. For each received signal, the node address and signal strength can be recorded at 1304. Any other relevant information regarding the node can also be recorded.

At 1306, average signal strength can be computed for each of the nodes from which a transmission has been received. The average can be determined based upon all signals received from a node. Alternatively, an average can be computed for a subset of transmissions. For example, the last ten transmissions from a node can be averaged. At 1308, a message or transmission including node information can be generated. The transmission can be broadcast periodically or can be transmitted upon request.

Figure 14:
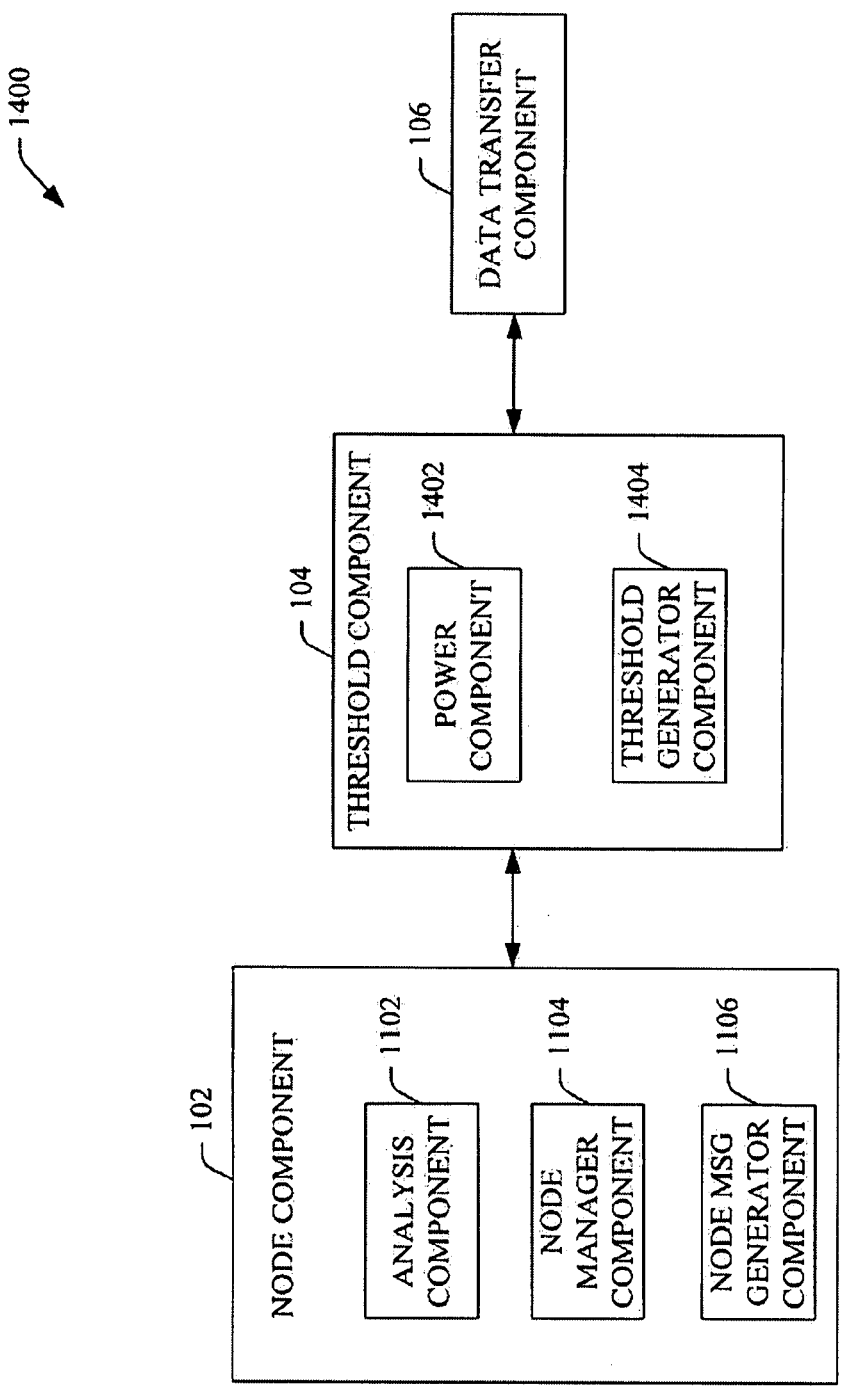
FIG. 14 is a block diagram of a system that dynamically determines a carrier-sensing threshold in accordance with one or more aspects presented herein.

Turning now to FIG. 14, another aspect of the communication of system FIG. 1 that utilizes dynamic carrier sensing thresholds to facilitate wireless communications is illustrated. Threshold component 104 can include a power component 1402 that evaluates node information maintained by the node manager component 1104 and determines power and/or interference received from hidden nodes. In particular, the node information can include an RSSI between each of the neighboring nodes and the transmitting node. This node information can be used to determine the number of nodes hidden from the current access point. In addition, distance and interference from neighbor nodes can be estimated as described in further detail below.

Power component 1402 can utilize node information to gauge the number of hidden nodes for a MAP receiving the node information, referred to as a receiving AP. RSSI from a hidden node to the receiving AP can be estimated using the algorithm represented in the following pseudo code:

```
Start( )
{
Receive node information;
Compute the number of hidden nodes;
For (each hidden node j)
    {
    Determine RSSI from hidden node j to the transmitting MAP;
    Convert RSSI to path distance from hidden node to the transmitting MAP;
    Convert the signal RSSI to distance from the transmitting MAP to receiving MAP;
    Use distance formula to estimate the distance between hidden node j and the receiving MAP;
    Convert this distance to received power, assuming a fixed transmit power.
        For (each transmit power level k)
        {
        Compute the received power;
        }
    }
Add the total power at the receiving MAP if all the hidden nodes described by transmitting MAP are taken into account;
    }
}
```

This process can be repeated for each neighboring MAP that provides node information to the receiving MAP. The total cumulative received power is equivalent to the total interference observed by the receiving MAP from all the hidden nodes. Interference from transmitting MAPs is not computed, since the current carrier-sensing threshold will cause such MAPs to avoid transmitting when RTS or CTS is exchanged from this neighbor.

Cumulative interference from hidden nodes can be provided for and included in transmission requests whenever the receiving access point transmits a request to transmit signal (RTS) or a clear to send signal (CTS). If the receiving access point is issuing the CTS, the node will know the desired physical transmission rate for communication with a neighboring access point. The access point can raise transmit power such that the hidden nodes are likely to refrain from transmitting when it is receiving transmission from any of the neighboring transmitting MAPs.

Threshold component 104 can include a threshold generator component 1404 that determines a dynamic carrier-sensing threshold (CST) based at least in part upon analysis of the received node information obtained by the node component 102. The computed carrier-sensing threshold can be selected to increase the number of access points that can communicate at approximately the same time, while preventing excessive levels of interference.

In the IEEE 802.11a/g/n systems, if the physical layer for a node was not able to detect the presence of preamble and pilot, the node can raise its energy detection threshold 20 dB above the receive threshold of −82 dBm at 6 Mbps. In such systems it is the 6 Mbps (BPSK modulation) that limits the detection performance. In such networks, if a pair of nodes (e.g., a WLAN transceiver pair) was to communicate at very high physical transmission rate (e.g., a higher modulation and coding scheme), relatively low amounts of interference can cause errors and potential loss or corruption of data. Consequently, other nodes can communicate only if they are far enough away from the pair of nodes to avoid interference. The potential interfering node or potential interferer may be relatively far away from the receiver such that the frame can be decoded with low probability of error.

An exemplary formula that determines the carrier sensing threshold as a function of the operating PHY rate and the number of interferers is given by:

$$D_{CSThresh}^{(m)} \approx d \times \sqrt[\gamma]{N_{INT} \times 10^{\frac{SINR(m)}{10}}}$$

In the above equation, d represents the distance between the source node and the destination node, also referred to as the source-destination distance, $\gamma$ is the path loss coefficient, $N_{INT}$ represents the number of hidden nodes who may interfere with the intended receiver when it is receiving the data, and SINR(m) represents the minimum required signal to interference noise ratio (SINR) for achieving a modulation/coding rate (m).

Threshold generator component 1404 can dynamically determine an appropriate carrier sensing threshold (CST) as a function of the transmit power, interference distance, and path loss. CST can be computed whenever an access point generates an RTS frame for a destination MAP. The destination node can compute potential interference based upon neighboring nodes and compute a new carrier-sensing threshold. The destination node can send the CTS at the new power level to NAV out interferers.

Figure 15:
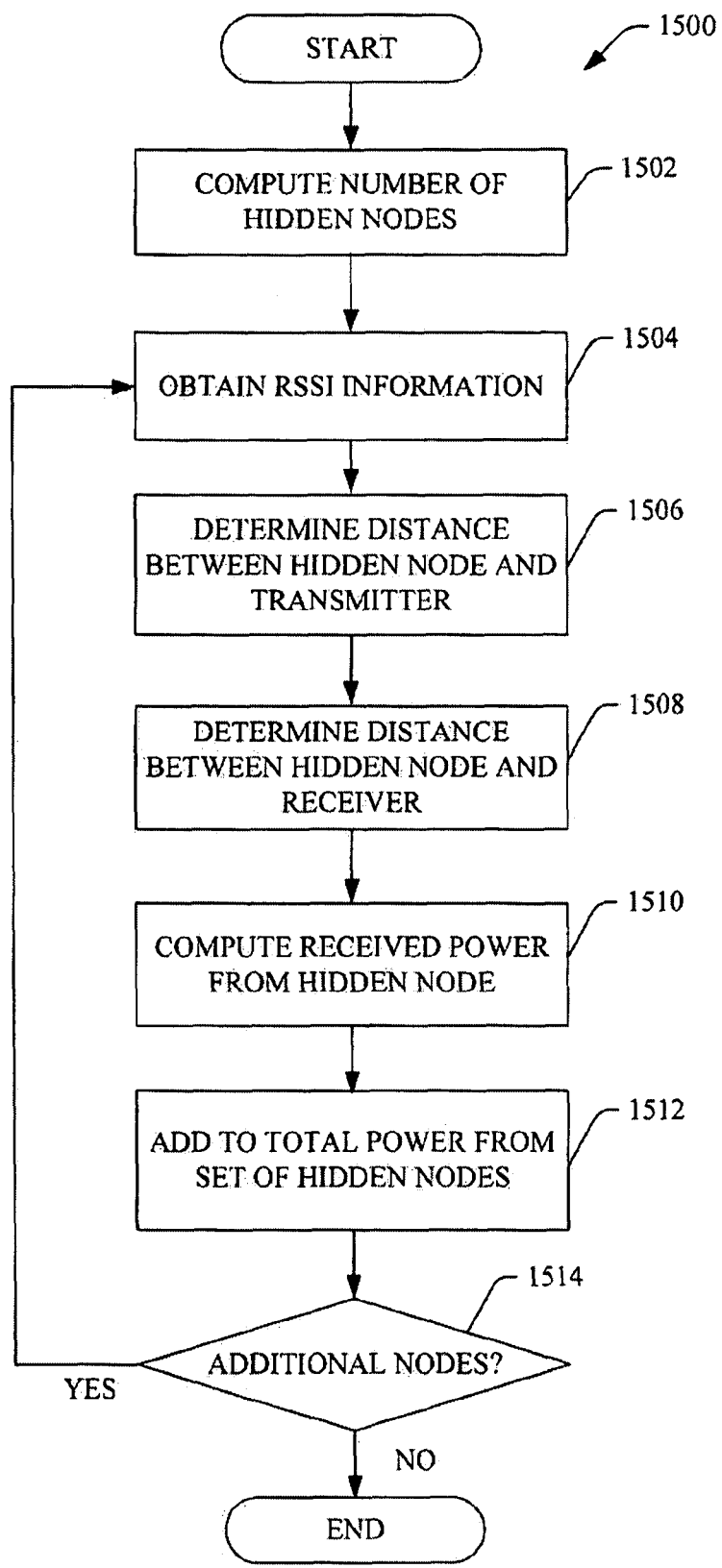
FIG. 15 illustrates a methodology for determining an appropriate transmit power in accordance with one or more aspects presented herein.

FIG. 15 illustrates an exemplary methodology 1500 for determining an appropriate transmit power. At 1502, the number of hidden nodes is computed based upon node information obtained from one or more neighboring access points. RSSI information for a node can be obtained at 1504. For instance, node manager component 1104 can retrieve RSSI information for a particular hidden node. At 1506, the distance between the hidden node and the access point that provided the node information can be computed as a function of the RSSI.

Distance between the hidden node and the receiving access point can be computed at 1508. This distance can be computed based upon the distance between a hidden node and the node that provides the node information and the distance between the providing node and the access point receiving the node information. The distance formula can be used to compute this distance.

At 1510, the power received at the receiving access point based upon transmissions from this hidden node can be computed. This power can be added to power from transmissions received from other hidden nodes to obtain the total power observed by the receiving access point at 1512. At 1514, a determination can be made as to whether there are additional hidden nodes to process. If yes, then the process returns to 1504 where RSSI information for the next hidden node is obtained. If no, then the process can terminate having computed total power from hidden nodes for a particular receiving access point. This power can be used to compute the interference observed by the receiving access point and determine appropriate carrier-sensing thresholds and/or transmit power.

Figure 16:
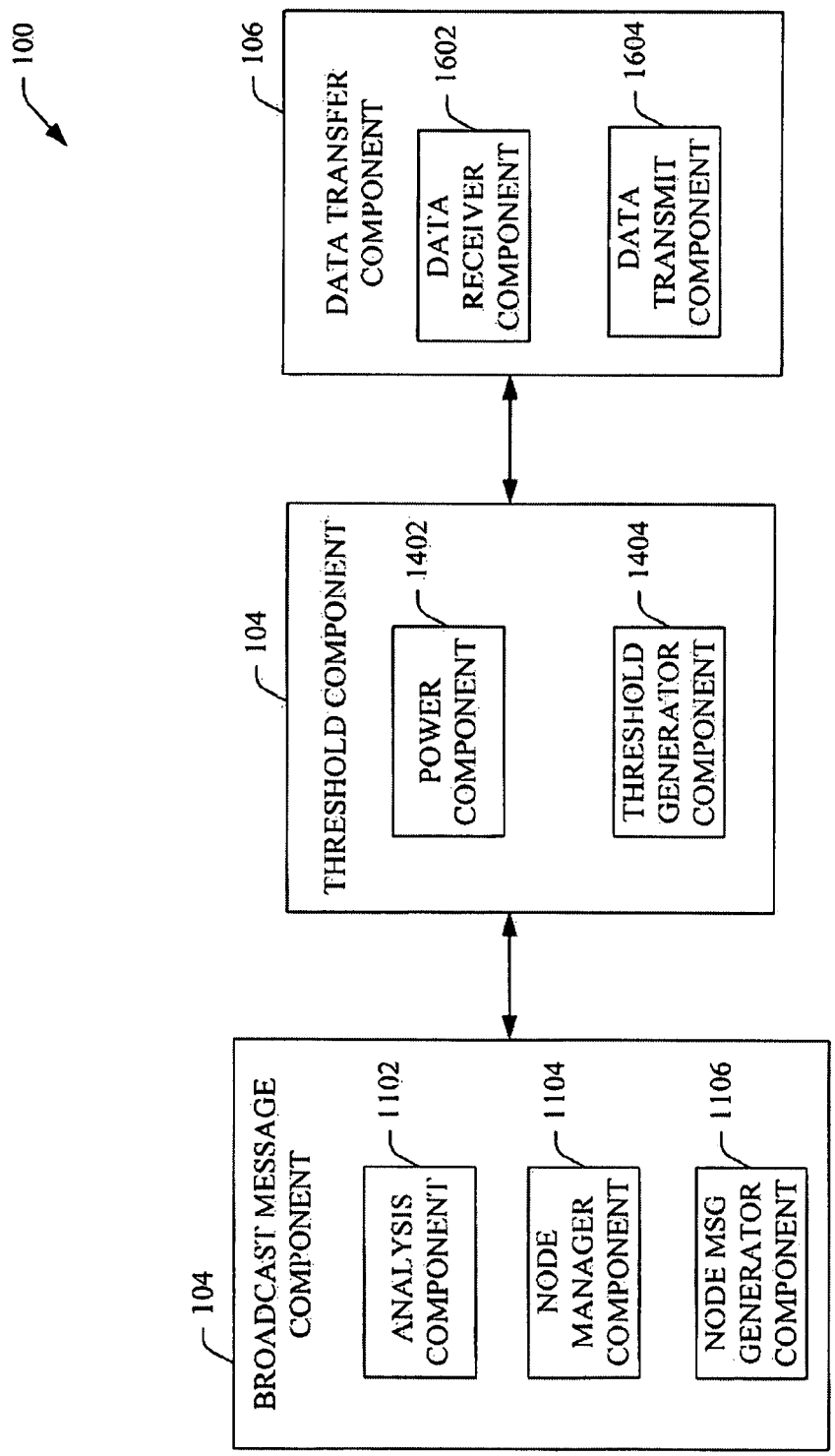
FIG. 16 is a block diagram of a system that utilizes a dynamically determined carrier-sensing threshold to control data transfer in accordance with one or more aspects presented herein.

Referring now to FIG. 16, a further aspect of the system of FIG. 1 is illustrated. Data transfer component 106 can include a data receiver component 1602 that receives requests for communication and/or data transmissions, such as an RTS. The received RTS can include a carrier-sensing threshold as determined by the sending access point. One advantage of including carrier-sensing threshold information in RTS signal is that neighboring nodes are informed of the transmitter's design. Hidden nodes that receive the request can determine if their transmissions are likely to cause interference at the intended receiver, which may or may not be hidden from it. The dynamic carrier-sensing threshold can also be included within the CTS.

Data transfer component 106 can also include data transmit component 1604 that can transmit data. In particular, data transmit component 1604 send an RTS or CTS signal to facilitate communication with other access points. Data transmit component 1604 can utilize the threshold as determined by threshold generator component 1504 to detect transmission from other nodes and determine whether to refrain from transmitting Data transmit component 1604 can utilize power as determined by power component 1402 to transmit RTS, CTS and any other signals or messages. In addition, data transmit component 1604 can signal neighboring nodes, including hidden nodes, by transmitting at a particular power after the CTS signal. The signal can direct neighboring nodes to refrain from transmitting during a particular period. Transmission power is capped by the standards and Federal Communications Commission (FCC) regulations. To contact nodes while keeping transmission power below maximum levels specified by the FCC, data transmit component 1604 can transmit over a subset of carriers.

After transmitting the CTS frame, in continuum, the data transmit component 1604 can transmit at a fixed power on selected sub tones. The power can be a function of the physical rate of communication between the intended MAP transmitter and the receiving access point. When the same total power is applied on certain subset of orthogonal frequency division multiplexing (OFDM) tones, the power spectral density (PSD) is increased. This increase results in the signal reaching further than it would if all power were applied on all the tones (except the guard tones). In particular, there are 64 carriers in the IEEE 802.11a/g/n protocol and the maximal power spectral density can be obtained when transmitting the entire total power on one sub-carrier. This would represent the maximal range that could be covered by the IEEE 802.11a/g/n system. The shaped PSD can be transmitted for a predetermined period of time, long enough to allow potential interferers to sample the energy of the shaped PSD and refrain from transmitting during duration of communication between the transmitting AP and the receiving AP. For example, the shaped PSD can be transmitted for at least 4 microseconds.

The length of the transmission of the shaped PSD can be used to control the period in which the nodes will refrain from transmitting. The shaped PSD can be transmitted for one of a set of predetermined time periods (e.g., 4 microseconds, 8 microseconds, and so on). Typically, 4 microseconds is the minimal time the detection algorithm works in all receivers. Depending upon the length of the shaped PSD transmission, receiving nodes will refrain from transmitting for a predefined period of time. For example, four levels of PSD transmissions can be defined. If the transmission is 4 microseconds in length, then potential interferers are directed to refrain from transmitting for a certain time period, t1. If the PSD waveform is transmitted for 8 microseconds, then the potential interferer is directed to refrain from transmitting for a second predefined period, t2 and so on.

Figure 17:
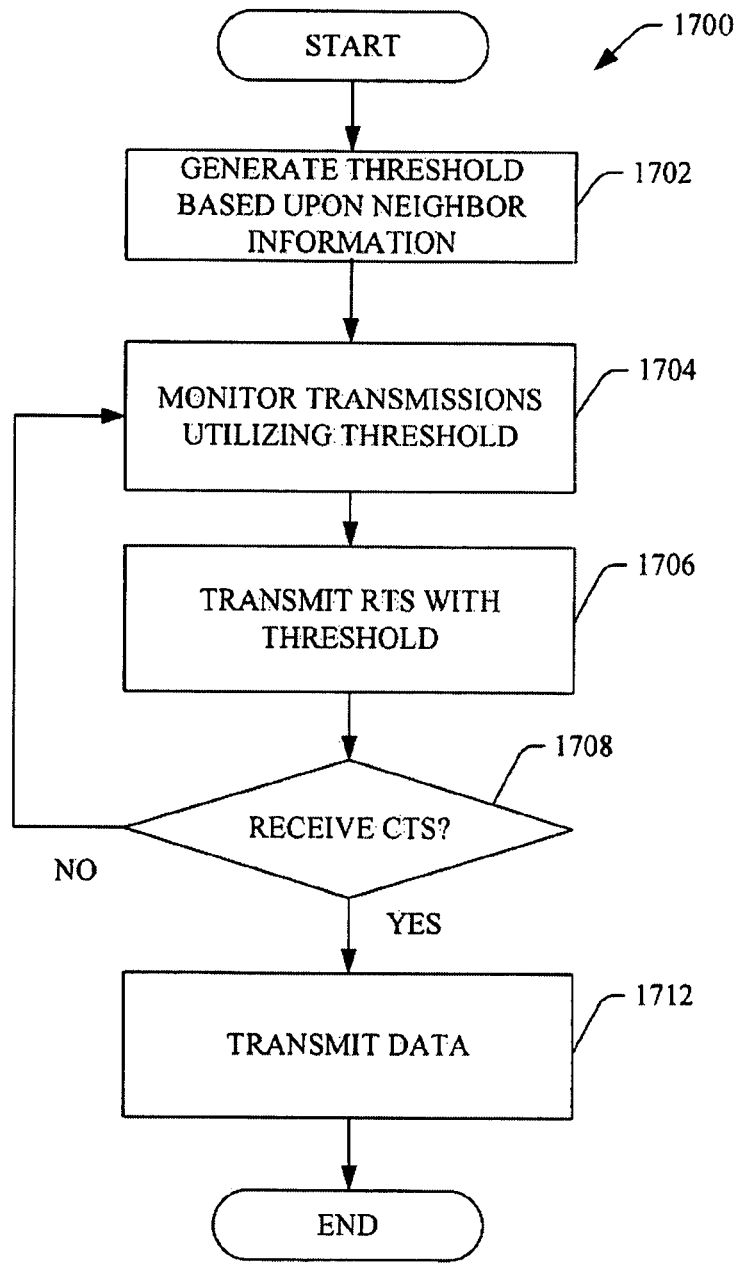
FIG. 17 illustrates a methodology for initiating communication with a neighboring access point in accordance with one or more aspects presented herein.

FIG. 17 depicts an exemplary methodology 1700 for initiating communication with a neighboring access point. At 1702, a carrier-sensing threshold can be computed based upon interference from hidden nodes, distance to the receiving access point and/or desired transmission rate. At 1704, the medium can be monitored using the computed threshold to determine whether a transmission can be sent. Once it is determined that it is clear to transmit, a request to transmit or RTS can be sent to the target access point 1706. The RTS can include threshold information, providing any receiving nodes with information regarding transmissions from the access point. The RTS can also signal a desired PHY rate to the target access point.

At 1708, a determination can be made as to whether the access point has received a CTS signal granting permission to transmit. If no, the process returns to 1704, where the access point monitors the medium waiting for the next opportunity to request communication. If yes, the access point can begin transfer of data at 1710. The received CTS signal can also include a carrier-sensing threshold as determined by the target access point.

Figure 18:
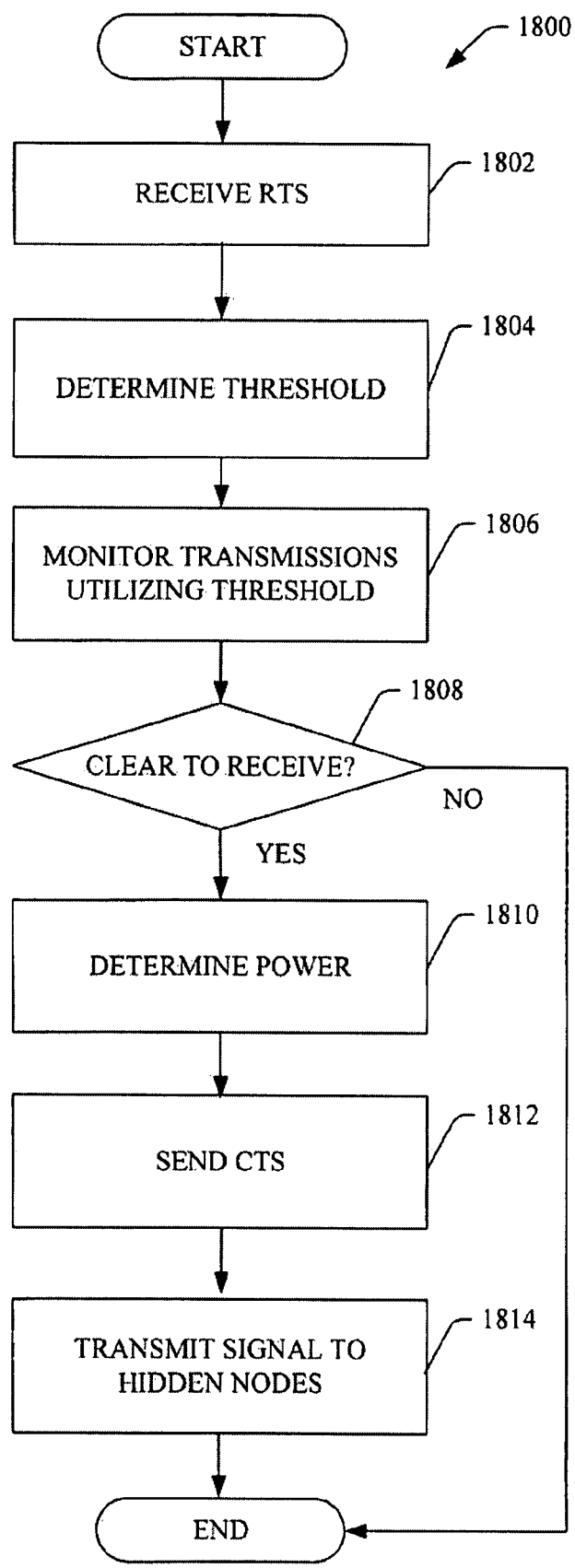
FIG. 18 illustrates a methodology for responding to a communication request in accordance with one or more aspects presented herein.

Referring now to FIG. 18, an exemplary methodology 1800 for responding to a communication request is illustrated. At 1802, a RTS or other request for communication can be received. At 1804, the carrier-sensing threshold can be determined. The threshold can be computed as a function of interference received from hidden nodes, determined based upon received node information. Threshold can also be a function of the PHY rate requested, which can be determined based upon the RTS. Distance between the source and destination access points can also affect computation of the appropriate threshold level.

At 1806, the destination access point can monitor the medium to determine if there is transmission that would interfere with communication with the source access point. At 1808, a determination can be made as to whether the medium is clear for transmission. If no, the process can terminate until another RTS is received. If yes, the appropriate transmission power for the CTS signal can be determined at 1810. The transmission power can be based upon information regarding hidden nodes, distance between the source and destination access points and any other relevant information. At 1812, a CTS signal can be transmitted to the source access point, granting permission to transfer data. The CTS can also include the computed carrier-sensing threshold, informing any receiving nodes.

In addition, at 1814, a signal can be transmitted to notify nearby nodes not to transmit during the transfer of data from the source access point. The power of the signal can be a function of the physical rate of communication between the intended source access point and the destination access point. The signal can be a shaped PSD signal and length of the transmission of the shaped PSD can be used to control the period in which the nodes will refrain from transmitting. The shaped PSD can be transmitted for one of a set of predetermined time periods (e.g., 4 microseconds, 8 microseconds, and so on). Typically, 4 microseconds is the minimal time the detection algorithm works in all receivers. Depending upon the length of the shaped PSD transmission, receiving nodes will refrain from transmitting for a predefined period of time.

Figure 19:
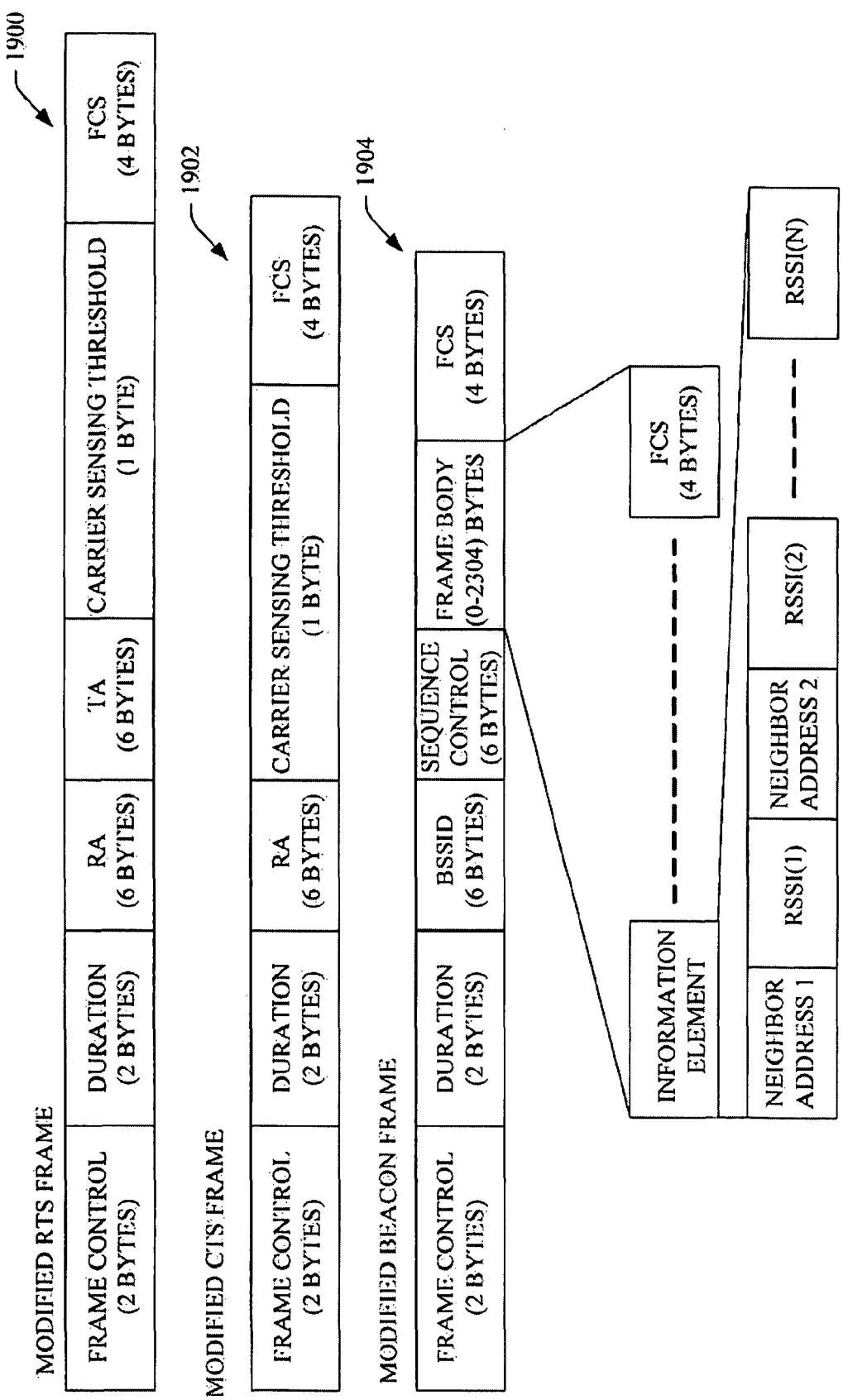
FIG. 19 illustrates exemplary frames for communicating node information and/or dynamic carrier-sensing thresholds in accordance with one or more aspects presented herein.

Turning now to FIG. 19, exemplary frames for communicating node information and/or dynamic carrier-sensing thresholds are illustrated. A modified request to transmit signal (RTS) frame 1900 can include an additional byte that specifies the computed carrier-sensing threshold (CST). This RTS frame can be transmitted from a source access point to a destination access point with which the source desires to communicate. The destination access point can grant permission by transmitting a modified clear to transmit signal (CTS). The modified CTS frame 1902 can also include the computed carrier-sensing threshold (CST).

Node information can be provided to neighboring access points utilizing a broadcast message, such as the beacon signal of the 802.11s protocol. A modified broadcast message or beacon frame 1904 can include an information element within the body of the frame. The information element can include node information for neighboring nodes of the access point transmitting the beacon frame. In particular, the information element can include an address and RSSI for each neighboring node.

While, for purposes of simplicity of explanation, the methodologies above are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be utilized to implement a methodology in accordance with one or more aspects.

It will be appreciated that inferences can be made regarding classification of terminal, etc. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 20:
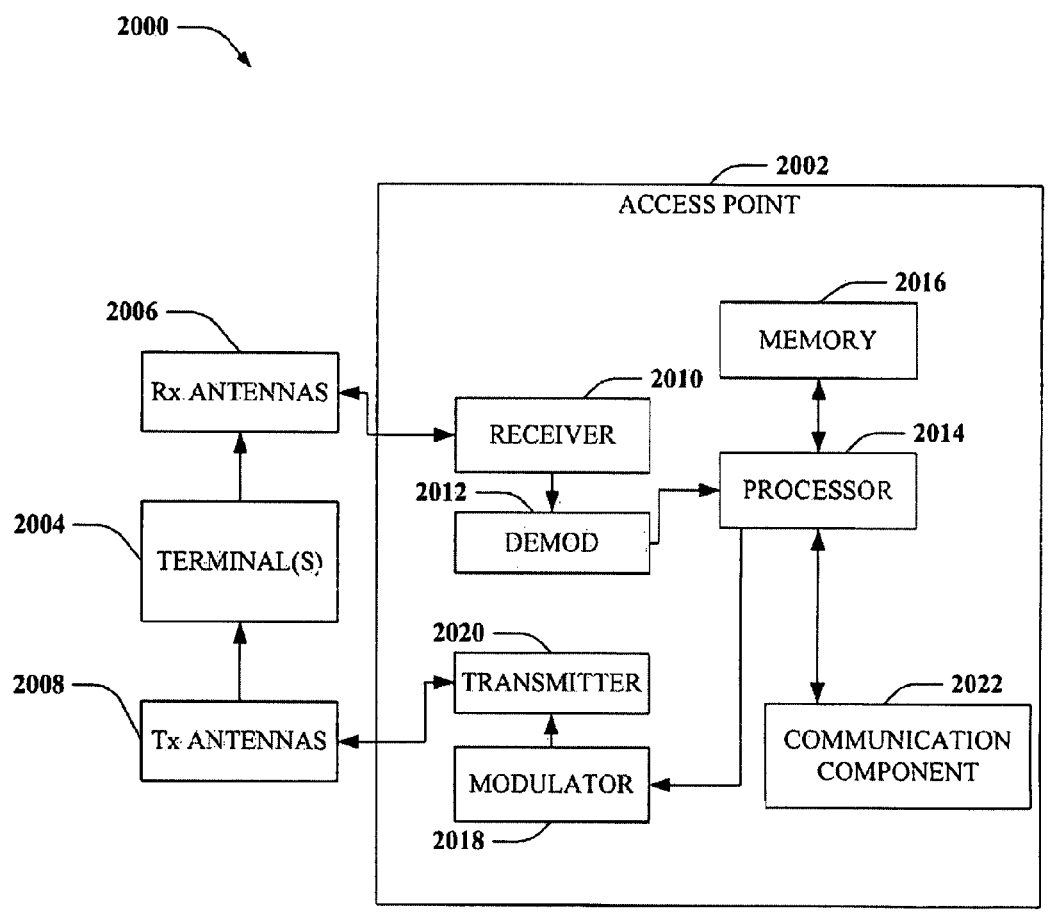
FIG. 20 is an illustration of a wireless communication system in accordance with one or more aspects presented herein.

FIG. 20 is an illustration of a system 2000 that facilitates use of dynamic carrier-sensing thresholds in a communication environment in accordance with various aspects. System 2000 comprises an access point 2002 with a receiver 2010 that receives signal(s) from one or more terminals 2004 through one or more receive antennas 2006, and transmits to the one or more terminals 2004 through a one or more transmit antennas 2008. In one or more aspects, receive antennas 2006 and transmit antennas 2008 can be implemented using a single set of antennas. Receiver 2010 can receive information from receive antennas 2006 and is operatively associated with a demodulator 2012 that demodulates received information. Receiver 2010 can be an MMSE-based receiver, or some other suitable receiver for separating out terminals assigned thereto, as will be appreciated by one skilled in the art. According to various aspects, multiple receivers can be employed (e.g., one per receive antenna), and such receivers can communicate with each other to provide improved estimates of user data.

Access point 2002 further comprises a communication component 2022, which can be a processor distinct from, or integral to, receiver 2010. Communication component 2022 can analyze and evaluate node information and compute a transmit power and dynamic carrier-sensing threshold to optimize network throughput.

Demodulated symbols are analyzed by a processor 2014. Processor 2014 is coupled to a memory 2016 that stores information related to equalization, such as the equalizer function, equalizer matrices, and any other data related to equalization. It will be appreciated that the data store (e.g., memories) components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 2010 of the subject systems and methods is intended to comprise, without being limited to, these and any other suitable types of memory. Receiver output for each antenna can be jointly processed by receiver 2010 and/or processor 2014. A modulator 2018 can multiplex the signal for transmission by a transmitter 2020 through transmit antennas 2008 to terminals 2004.

Figure 21:
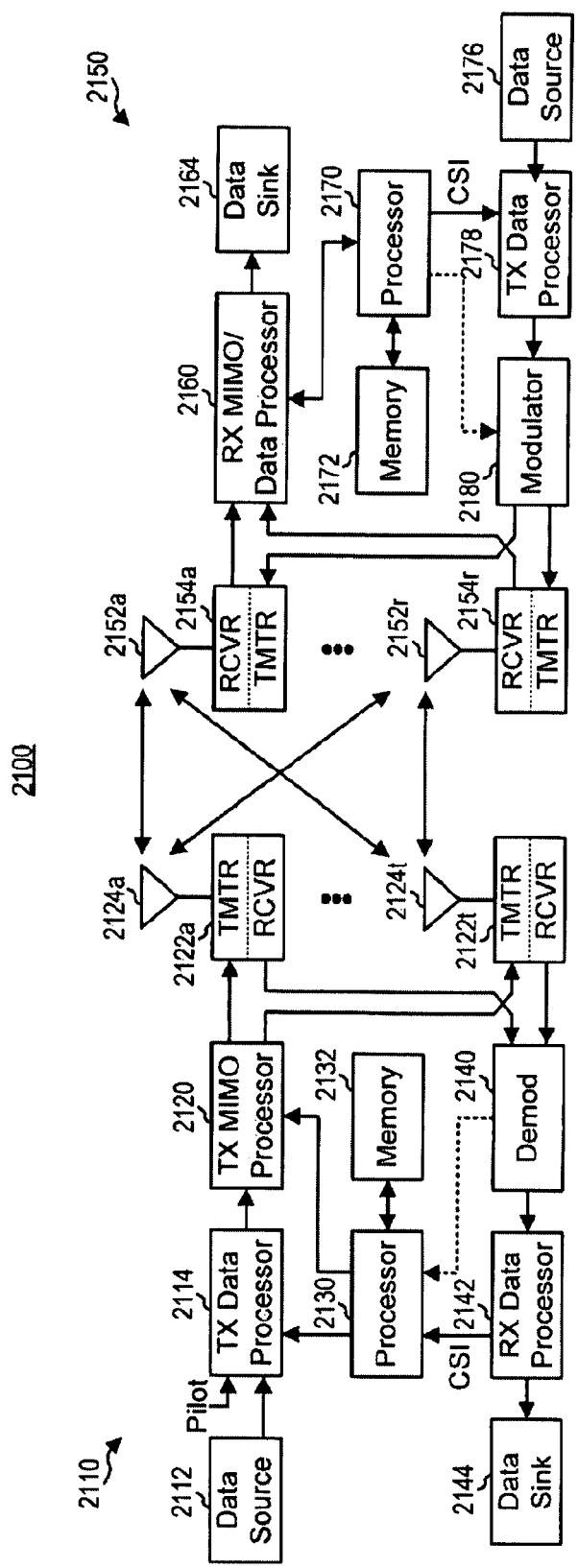
FIG. 21 is an illustration of a wireless communication environment that can be employed in conjunction with the various systems and methods described herein.

Referring to FIG. 21, one embodiment of a transmitter and receiver in a multiple access wireless communication system 2100 is illustrated. At transmitter system 2110, traffic data for a number of data streams is provided from a data source 2112 to a transmit (TX) data processor 2114. In an embodiment, each data stream is transmitted over a respective transmit antenna. TX data processor 2114 formats, codes, and interleaves the traffic data for each data stream based on a particular coding scheme selected for that data stream to provide coded data. In some embodiments, TX data processor 2114 applies precoding weights to the symbols of the data streams based upon the user and the antenna from which the symbols are being transmitted. In some embodiments, the precoding weights may be generated based upon an index to a codebook generated at the transceiver, 2154 and provided as feedback to the transceiver, 2122, which has knowledge of the codebook and its indices. Further, in those cases of scheduled transmissions, the TX data processor 2114 can select the packet format based upon rank information that is transmitted from the user.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (e.g., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 2130.

The modulation symbols for all data streams are then provided to a TX MIMO processor 2120, which may further process the modulation symbols (e.g., for OFDM). TX MIMO processor 2120 then provides $N_T$ modulation symbol streams to $N_T$ transceivers (TMTR) 2122a through 2122t. In certain embodiments, TX MIMO processor 2120 applies precoding weights to the symbols of the data streams based upon the user to which the symbols are being transmitted to and the antenna from which the symbol is being transmitted from that user channel response information.

Each transceiver, 2122 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 2122a through 2122t are then transmitted from $N_T$ antennas 2124a through 2124t, respectively.

At receiver system 2150, the transmitted modulated signals are received by NR antennas 2152a through 2152r and the received signal from each antenna 2152 is provided to a respective transceiver, (RCVR) 2154. Each transceiver 254 conditions (e.g., filters, amplifies, and downconverts) a respective received signal, digitizes the conditioned signal to provide samples, and further processes the samples to provide a corresponding "received" symbol stream.

An RX data processor 2160 then receives and processes the $N_R$ received symbol streams from $N_R$ transceivers 2154 based on a particular receiver processing technique to provide $N_T$ "detected" symbol streams. The processing by RX data processor 2160 is described in further detail below. Each detected symbol stream includes symbols that are estimates of the modulation symbols transmitted for the corresponding data stream. RX data processor 2160 then demodulates, deinterleaves, and decodes each detected symbol stream to recover the traffic data for the data stream. The processing by RX data processor 2160 is complementary to that performed by TX MIMO processor 2120 and TX data processor 2114 at transmitter system 2110.

The channel response estimates generated by RX processor 2160 may be used to perform space, space/time processing at the receiver, adjust power levels, change modulation rates or schemes, or other actions. RX processor 2160 may further estimate the signal-to-noise-and-interference ratios (SINRs) of the detected symbol streams, and possibly other channel characteristics, and provides these quantities to a processor 2170. RX data processor 2160 or processor 2170 may further derive an estimate of the "operating" SINR for the system. Processor 2170 then provides estimated (CSI), which may comprise various types of information regarding the communication link and/or the received data stream. For example, the CSI may comprise only the operating SINR. The CSI is then processed by a TX data processor 2178, which also receives traffic data for a number of data streams from a data source 2176, modulated by a modulator 2180, conditioned by transceivers 2154a through 2154r, and transmitted back to transmitter system 2110.

At transmitter system 2110, the modulated signals from receiver system 2150 are received by antennas 2124, conditioned by receivers 2122, demodulated by a demodulator 2140, and processed by a RX data processor 2142 to recover the CSI reported by the receiver system. The reported quantized information (e.g., CQI) is then provided to processor 2130 and used to (1) determine the data rates and coding and modulation schemes to be used for the data streams and (2) to generate various controls for TX data processor 2114 and TX MIMO processor 2120.

The techniques described herein may be implemented by various means. For example, these techniques may be implemented in hardware, software, or a combination thereof. For a hardware implementation, the processing units for these techniques may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

Figure 22:
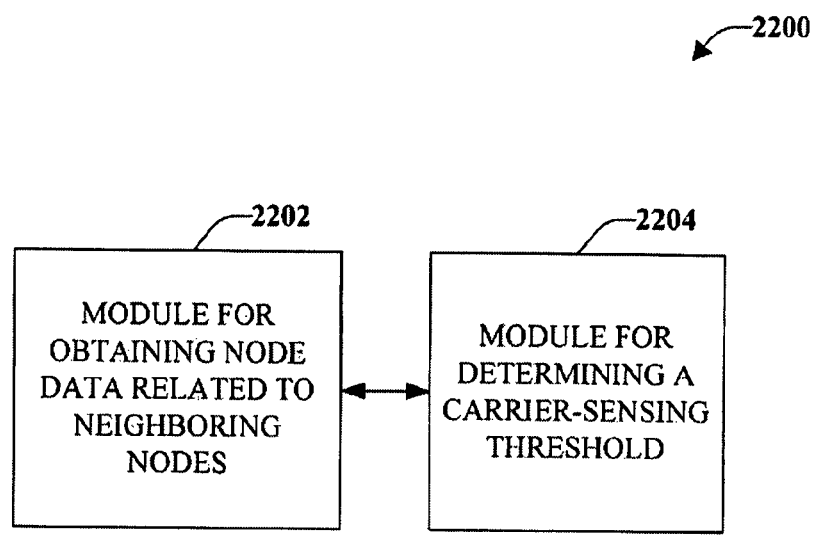
FIG. 22 is an illustration of a system that facilitates wireless communication using dynamic carrier thresholds in accordance with one or more aspects presented herein.

Referring now to FIG. 22, an aspect of a system 2200 that facilitates optimization of wireless network throughput is illustrated. System 2200 includes a module 2202 that obtains node data related to neighboring nodes. In particular, access points can transmit periodic broadcasts that list nearby nodes and include node data. Such node data can include relative signal strength indicators (RSSIs). Furthermore, this node data can be incorporated into beacon frames utilized to control synchronization with clients of access points. Beacon frames can be transmitted to neighboring access points as well as clients.

System 2200 can also include a module 2204 that determines an appropriate carrier-sensing threshold based at least in part upon the obtained node data. Node data can be used to estimate numbers of hidden nodes and node interference experienced by an access point. A carrier-sensing threshold can be selected based upon this interference, distance between the source/destination access points, PHY rate and other relevant information. Selection of an appropriate carrier-sensing threshold provides for increased concurrent communications in the wireless network, increasing network throughput.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

What has been described above includes examples of one or more aspects. It is, of course, not possible to describe every conceivable combination of components or methodologies for purposes of describing the aforementioned aspects, but one of ordinary skill in the art may recognize that many further combinations and permutations of various aspects are possible. Accordingly, the described aspects are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method that facilitates communication in a wireless network environment, comprising:
   obtaining node information related to a neighboring node;
   identifying a hidden node from the node information;
   computing interference from and distance to the hidden node;
   determining an appropriate carrier-sensing threshold and transmit power to optimize network throughput as a function of the node information, the computed interference from the hidden node, and the computed distance to the hidden node;
   controlling data transfer based at least in part upon the carrier-sensing threshold and transmit power;
   adapting a power spectral density for a control message that signals the neighboring node to refrain from transmitting during the data transfer; and
   using an antenna for transmitting the control message.

2. The method of claim 1, further comprising receiving the node information in a periodic broadcast message.

3. The method of claim 1, wherein the distance to the hidden node is computed as a function of a received signal strength indicator included in the node information.

4. The method of claim 1, further comprising determining a transmit power for the data transfer as a function of a transfer rate.

5. The method of claim 1, further comprising including the carrier-sensing threshold in a request to transfer data.

6. The method of claim 1, further comprising including the carrier-sensing threshold in a signal that grants permission to transfer data.

7. The method of claim 1, wherein a length of the control message is indicative of a length of time that the neighboring node is to refrain from transmitting.

8. The method of claim 1, further comprising:
   recording a received signal strength indicator from at least one node;
   generating a beacon frame including the received signal strength indicator; and
   transmitting the beacon frame.

9. The method of claim 1, further comprising:
   based on the node information, computing a number of hidden nodes;
   for each hidden node,
      determining a received signal strength indicator from the hidden node to an access point transmitting the node information,
      converting the received signal strength indicator to a distance from the access point transmitting the node information to an access point receiving the node information,
      based on the converted distance, estimating a distance between the hidden node and the access point receiving the node information, and
      converting the estimated distance to a received power;
   computing a cumulative power corresponding to a received power for each hidden node; and
   providing a cumulative interference from hidden nodes, corresponding to the cumulative power, in a request to transmit signal or a clear to send signal.

10. The method of claim 1, wherein adapting the power spectral density maintains the control signal at a constant total power.

11. The method of claim 10, wherein the adapting includes increasing a range of the control signal by increasing the power spectral density.

12. The method of claim 1, further comprising transmitting a request-to-transfer signal, wherein the request-to-transfer signal includes a data representing the carrier-sensing threshold.

13. The method of claim 1, further comprising transmitting a clear-to-transmit signal, wherein the clear-to-transmit signal includes a data representing the carrier-sensing threshold.

14. The method of claim 1, wherein the computed distance to the hidden node corresponds to a path distance to the hidden node from a node transmitting the node information.

15. An apparatus that facilitates network communication, comprising:
a processor that executes instructions for receiving information associated with at least one hidden network node, computing an interference associated with and a distance to the at least one hidden network node, selecting a carrier-sensing threshold and transmit power as a function of the received information, the computed interference, and the computed distance, managing network communication based at least in part upon the carrier-sensing threshold and transmit power, and adapting a power spectral density for a control signal that directs the at least one hidden network node to refrain from transmitting; and
a memory coupled to the processor.

16. The apparatus of claim 15, wherein the processor further executes instructions for computing the interference as a function of a received signal strength indicator included in the node information.

17. The apparatus of claim 15, wherein the processor further executes instructions for transmitting the control signal and wherein a length of the control signal determines a length of time the at least one hidden network node is to refrain from transmitting.

18. The apparatus of claim 15, wherein the carrier-sensing threshold is included in a request for network communication.

19. The apparatus of claim 15, wherein the carrier-sensing threshold is included in a grant of permission for network communication.

20. An apparatus that facilitates optimization of network throughput, comprising:
means for obtaining node data related to a hidden network node;
means for computing interference from and distance to the hidden node based on the node data;
means for setting a carrier-sensing threshold and transmit power as a function of the node data, the computed interference, and the computed distance, wherein the carrier-sensing threshold and transmit power are utilized to direct data transfers between a source access point and a destination access point; and
means for adapting a power spectral density for a control signal that signals the hidden network node to refrain from transmitting during the data transfers.

21. The apparatus of claim 20, further comprising means for receiving a periodic, broadcast message containing the node data.

22. The apparatus of claim 20 wherein the carrier-sensing threshold is based at least in part upon the interference.

23. The apparatus of claim 20, further comprising means for transmitting a data transfer request that includes the carrier-sensing threshold.

24. The apparatus of claim 20, further comprising:
means for transmitting the control signal, wherein a length of the control signal is indicative of the length of time the hidden network node is to refrain from transmitting.

25. The apparatus of claim 20, wherein the means for adapting the power spectral density is configured to maintain the control signal at a constant total power.

26. The apparatus of claim 25, wherein the means for adapting is further configured to increase a range of the control signal by increasing the power spectral density.

27. A non-transitory computer-readable storage medium having instructions executable by a processor for:
receiving node information from at least one access point, the node information includes signal strength information related to at least one neighboring hidden node of the access point;
computing interference from and distance to the at least one neighboring hidden node;
determining a carrier-sensing threshold and transmit power utilized to manage data transmissions as a function of the received node information, the computed interference, and the computed distance; and
adapting a power spectral density for a control signal that directs the at least one neighboring hidden node to refrain from transmitting during communication from a source access point.

28. The non-transitory computer-readable storage medium of claim 27, wherein the interference from the at least one neighboring hidden node is computed as a function of the received signal strength information.

29. The non-transitory computer-readable storage medium of claim 27, further comprising instructions for:
receiving a request to transmit from the source access point;
computing the transmit power as a function of transmit rate;
utilizing the carrier-sensing threshold to determine whether to grant permission to transmit; and
transmitting a clear to transmit signal utilizing the transmit power.

30. The non-transitory computer-readable storage medium of claim 29, further comprising instructions for:
transmitting the control signal.

31. The non-transitory computer-readable storage medium of claim 27 wherein adapting the power spectral density maintains the control signal at a constant total power.

32. The non-transitory computer-readable storage medium of claim 31, wherein adapting includes increasing a range of the control signal by increasing the power spectral density.

* * * * *